United States Patent
Hu et al.

(10) Patent No.: US 11,533,491 B2
(45) Date of Patent: Dec. 20, 2022

(54) PICTURE AND SUB-PICTURE BOUNDARY PROCESSING FOR COMBINED BILATERAL FILTER AND HADAMARD TRANSFORM DOMAIN FILTER AS IN-LOOP FILTERS

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 16/948,008

(22) Filed: Aug. 27, 2020

(65) Prior Publication Data

US 2021/0067784 A1    Mar. 4, 2021

Related U.S. Application Data

(60) Provisional application No. 62/893,021, filed on Aug. 28, 2019, provisional application No. 62/892,951, filed on Aug. 28, 2019.

(51) Int. Cl.
| | |
|---|---|
| *H04N 19/14* | (2014.01) |
| *H04N 19/117* | (2014.01) |
| *H04N 19/105* | (2014.01) |
| *H04N 19/176* | (2014.01) |
| *H04N 19/169* | (2014.01) |

(52) U.S. Cl.
CPC ........... *H04N 19/14* (2014.11); *H04N 19/105* (2014.11); *H04N 19/117* (2014.11); *H04N 19/176* (2014.11); *H04N 19/1883* (2014.11)

(58) Field of Classification Search
CPC .... H04N 19/14; H04N 19/105; H04N 19/176; H04N 19/1883; H04N 19/117; H04N 19/157
See application file for complete search history.

(56) References Cited

U.S. PATENT DOCUMENTS

| | | | |
|---|---|---|---|
| 2014/0146875 A1* | 5/2014 | Chong | H04N 19/182 375/240.02 |
| 2018/0160134 A1* | 6/2018 | Zhang | H04N 19/70 |
| 2019/0089961 A1* | 3/2019 | Ahn | H04N 19/159 |

(Continued)

OTHER PUBLICATIONS

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

(Continued)

*Primary Examiner* — Joseph W Becker
(74) *Attorney, Agent, or Firm* — Shumaker & Sieffert, P.A.

(57) ABSTRACT

An example device for coding video data includes a memory configured to store a block of video data and one or more processors, implemented in circuitry, and communicatively coupled to the memory. The one or more processors are configured to determine whether a transform and quantization are applied to the block of the video data and based on the transform and quantization not being applied to the block of video data, code the block of video data without applying bilateral filtering (BIF) or Hadamard transform domain filtering (HTDF).

29 Claims, 32 Drawing Sheets

(56) References Cited

U.S. PATENT DOCUMENTS

2020/0374513 A1* 11/2020 Xiu ..................... H04N 19/583

OTHER PUBLICATIONS

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].

Bross B., et al., "Versatile Video Coding (Draft 9)", JVET-R2001-vA, Joint Video Experts Team (JVET) of ITU-T SG 16 WP 3 and ISO/IEC JTC 1/SC 29/WG 11, 18th Meeting, by Teleconference, Apr. 15-24, 2020, 528 Pages.

Strom J., et al., "Combined bilateral/SAO loop filter", JVET-O0548, Joint Video Experts Team (JVET) of ITU-T SG 16 WP 3 and ISO/IEC JTC 1/SC 29/WG 11, 15th Meeting: Gothenburg, SE, Jul. 3-12, 2019, 6 Pages.

Ikonin S., et al., "Non-CE5: Hadamard transform domain in-loop filter", JVET-O1120, Joint Video Experts Team (JVET) of ITU-T SG 16 WP 3 and ISO/IEC JTC 1/SC 29/WG 11, 15th Meeting: Gothenburg, SE, Jul. 3-12, 2019, 5 Pages.

\* cited by examiner

PICTURE AND SUB-PICTURE BOUNDARY PROCESSING FOR COMBINED BILATERAL FILTER AND HADAMARD TRANSFORM DOMAIN FILTER AS IN-LOOP FILTERS

This application claims priority to U.S. Provisional Application No. 62/893,021, filed Aug. 28, 2019, and U.S. Provisional Application No. 62/892,951, filed on Aug. 28, 2019, the entire contents of both of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding. More specifically, this disclosure describes picture and sub-picture boundary processing for combined bilateral filtering (BIF) and Hadamard transform domain filtering (HTDF) as in-loop filters.

In one example, a method of coding video data includes determining whether a transform and quantization are applied to a block of the video data, and based on the transform and quantization not being applied to the block of video data, coding the block of video data without applying BIF or HTDF.

In another example, a device includes a memory configured to store a block of video data; and one or more processors, implemented in circuitry, and communicatively coupled to the memory, the one or more processors being configured to: determine whether a transform and quantization are applied to the block of the video data; and based on the transform and quantization not being applied to the block of video data, code the block of video data without applying BIF or HTDF.

In another example, a device includes means for determining whether a transform and quantization are applied to a block of the video data, and means for coding the block of video data without applying BIF or HTDF based on the transform and quantization not being applied to the block of video data.

In another example, a non-transitory computer-readable storage medium includes instructions that, when executed, cause one or more processors configured to code video data to: determine whether a transform and quantization are applied to a block of the video data; and based on the transform and quantization not being applied to the block of video data, code the block of video data without applying BIF or HTDF.

The details of one or more examples are set forth in the accompanying drawings and the description below. Other features, objects, and advantages will be apparent from the description, drawings, and claims.

DETAILED DESCRIPTION

In some video coding standards, there is not a clear definition of what a video coder (e.g., video encoder or video decoder) should do when a current to-be-filtered pixel requires pixels beyond a boundary, such as a picture boundary or a sub-picture boundary, for the filtering operation. As used herein, a required pixel is a pixel that, if otherwise available, would be included in a filter template. Because there is no clear definition of what a video coder should do in such circumstances, different video coders of different manufacturers may behave differently. If a video encoder behaves differently than a video decoder attempting to decode video data that the video encoder encoded, issues may occur that may lead to poor quality of video decoding.

According to the techniques of this disclosure, a video encoder and a video decoder may follow the same behavior when a current to-be-filtered pixel requires pixels beyond a boundary, such as a picture boundary or a sub-picture boundary, for the filtering operation. In some examples, the video encoder and the video decoder may not apply BIF or HTDF in such situations. In other examples, the video encoder and the video decoder may apply padding to a filter template and code the current to-be-filtered pixel based on the padded filter template. In other examples, the video encoder and the video decoder may apply a partial filter template to the current to-be-filtered pixel and renormalize a filter output. In this manner, both the video encoder and the video decoder may behave similarly when a current to-be-filtered pixel requires pixels beyond a boundary for the filtering operation.

Figure 1:
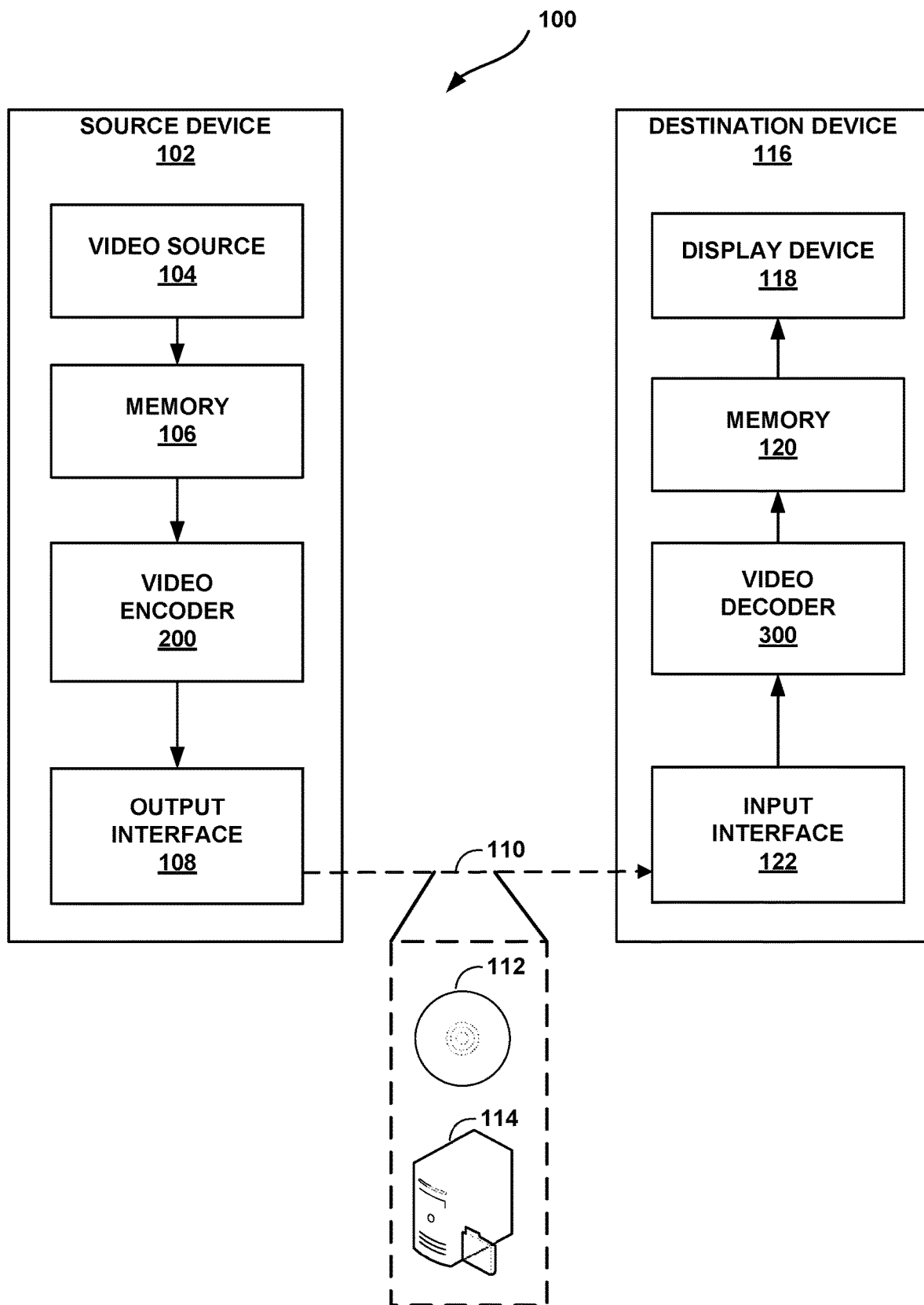
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for picture and sub-picture boundary processing for combined bilateral filtering (BIF) and Hadamard transform domain filtering (HTDF) as in-loop filters. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for picture and sub-picture boundary processing for combined bilateral filtering (BIF) and Hadamard transform domain filtering (HTDF) as in-loop filters.

Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memory 106 and memory 120 may store raw video data, e.g., raw video from video source 104 and raw, decoded video data from video decoder 300. Additionally, or alternatively, memory 106 and memory 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device.

A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). A recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-vA (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method of coding video data includes determining whether a transform and quantization are applied to a block of the video data, and based on the transform and quantization not being applied to the block of video data, coding the block of video data without applying bilateral filtering (BIF) or Hadamard transform domain filtering (HTDF).

In another example, a device for coding video data includes a memory configured to store a block of video data, and one or more processors, implemented in circuitry, and communicatively coupled to the memory, the one or more processors being configured to: determine whether a transform and quantization are applied to the block of the video data; and based on the transform and quantization not being applied to the block of video data, code the block of video data without applying BIF or HTDF.

In another example, a device for coding video data includes means for determining whether a transform and quantization are applied to a block of the video data, and means for coding the block of video data without applying BIF or HTDF based on the transform and quantization not being applied to the block of video data.

In another example, a non-transitory computer-readable storage medium is encoded with instructions that, when executed, cause a programmable processor to determine whether a transform and quantization are applied to a block of the video data, and based on the transform and quantization being applied to the block of video data, code the block of video data without applying BIF or HTDF.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
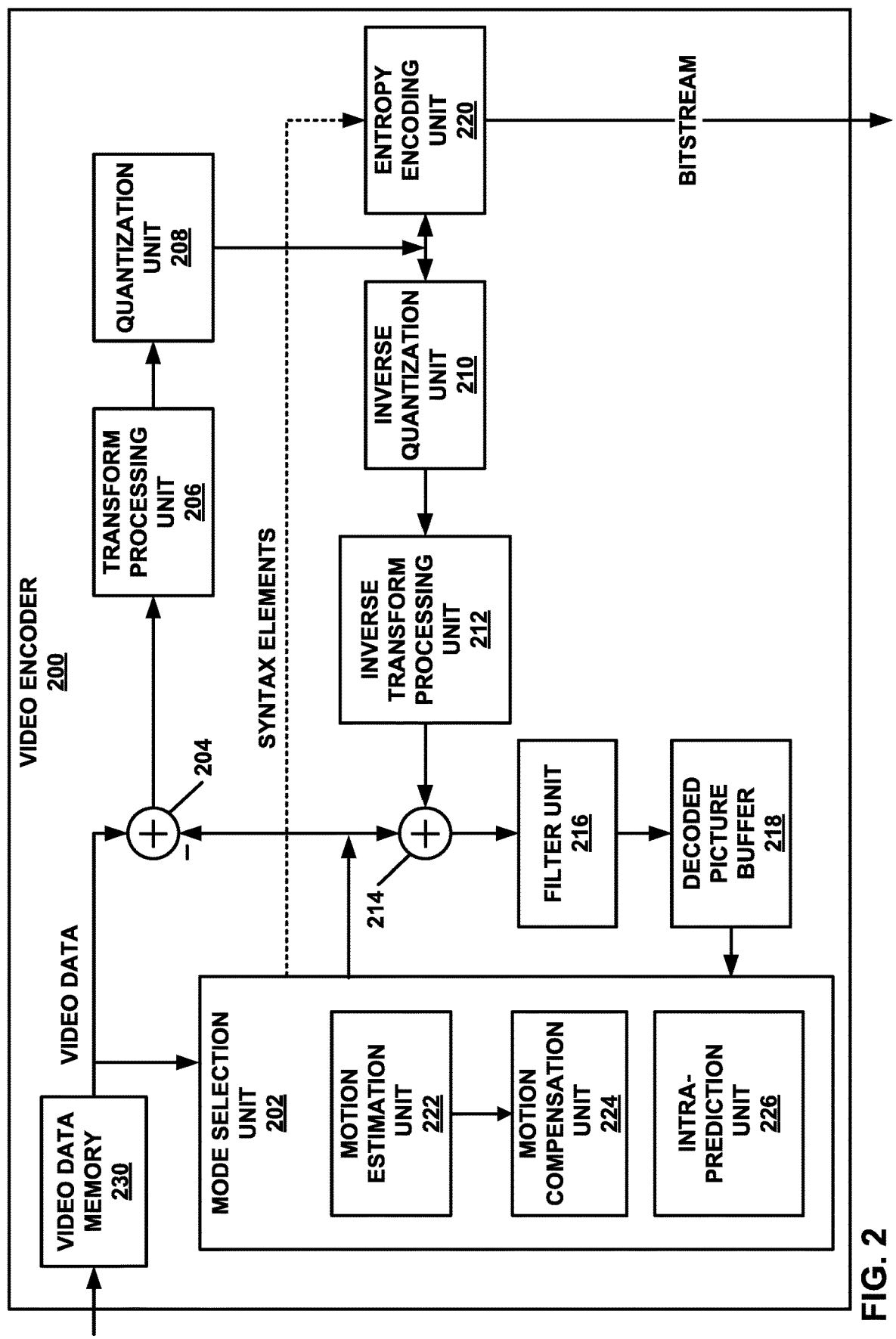
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. In some examples, according to the techniques of this disclosure, filter unit 216 may not perform BIF or HTDF filtering on a block of video data when a transform and quantization are not applied to the block of video data or, for example, when one or more pixels for a filter template are unavailable. In some examples, according to the techniques of this disclosure, filter unit 216 may pad a filter template before applying the padded filter template, for example, when one or more pixels for the filter template are unavailable. In other examples, filter unit 216 may apply a partial filter template and renormalize the filter output, for example, when one or more pixels for the filter template are unavailable.

Video encoder 200 stores reconstructed blocks in DPB 218. For instance, in examples where operations of filter unit 216 are not needed, reconstruction unit 214 may store reconstructed blocks to DPB 218 without filtering. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store a block of video data, and one or more processors, implemented in circuitry, and communicatively coupled to the memory, the one or more processors being configured to: determine whether a transform and quantization are applied to the block of the video data; and based on the transform and quantization not being applied to the block of video data, encode the block of video data without applying BIF or HTDF.

Figure 3:
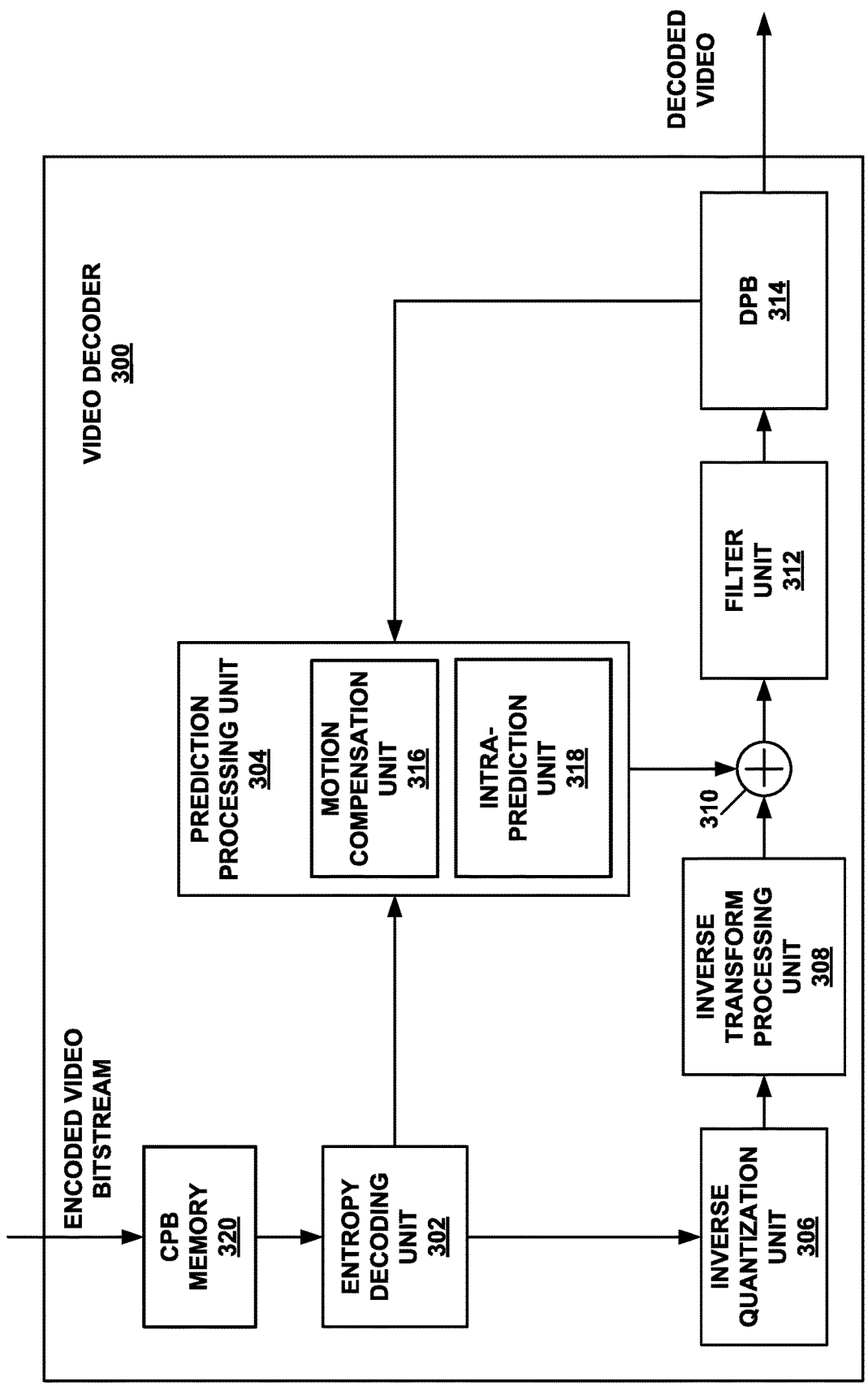
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. In some examples, according to the techniques of this disclosure, filter unit 312 may not perform BIF or HTDF filtering to a block of video data when a transform and quantization are not applied to the block of video data or, for example, when one or more pixels for a filter template are unavailable. In some examples, according to the techniques of this disclosure, filter unit 312 may pad a filter template before applying the padded filter template, for example, when one or more pixels for a filter template are unavailable. In other examples, filter unit 312 may apply a partial filter template and renormalize the filter output, for example, when one or more pixels for a filter template are unavailable.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a device configured to decode video data including a memory configured to store a block of video data, and one or more processors, implemented in circuitry, and communicatively coupled to the memory, the one or more processors being configured to: determine whether a transform and quantization are applied to the block of the video data; and based on the transform and quantization not being applied to the block of video data, decode the block of video data without applying BIF or HTDF.

Figure 4:
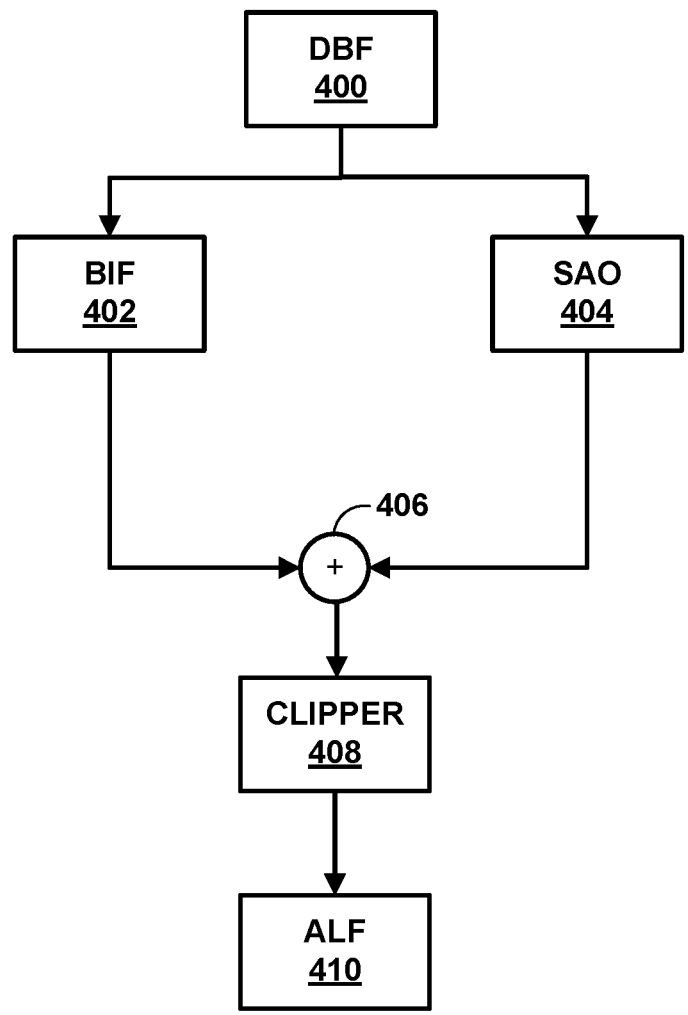
FIG. 4 is a conceptual diagram illustrating a combination of a bilateral filter (BIF) and a sample adaptive offset (SAO) filter.

FIG. 4 is a conceptual diagram illustrating a combination of bilateral filter (BIF) and a sample adaptive offset (SAO) filter. In Strom et al., "Combined bilateral/SAO loop filter," Joint Video Experts Team (WET) of ITU-T SG 16 WP 3 and ISO/IEC JTC 1/SC 29/WG 11, 15$^{th}$ meeting, Gothenburg, SE, 3-12 Jul. 2019, document no. JVET-O0548, (hereinafter, "JVET-O0548") a bilateral filter (BIF) is combined with a sample adaptive offset (SAO) filter in a loop filter stage, as shown in FIG. 4.

Both BIF 402 and SAO 404 operate on the same input, e.g., the output from deblocking filter 400 (DBF) (which may form a portion of filter unit 216 or filter unit 312). In the example, of FIG. 4, video encoder 200 or video decoder 300 may sum together the outputs of both BIF 402 and SAO 404 with summer 406 and clip the result through clipper 408. Video encoder 200 or video decoder 300 may apply an adaptive loop filter (ALF), such as ALF 410, to the clipped sum. For a pixel, a 3×3 pixel-pattern may be used to apply BIF.

Figure 5B:
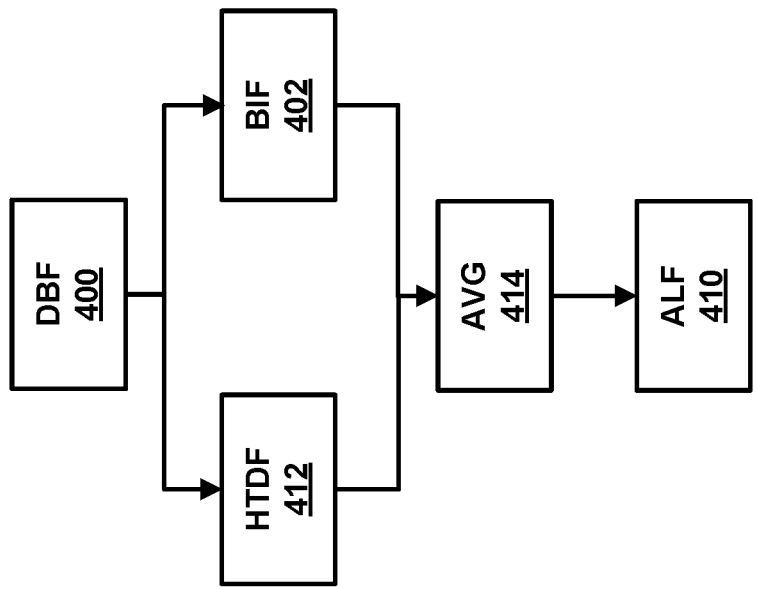
FIG. 5B is a conceptual diagram illustrating a combination of a HTDF and a BIF.
Figure 5A:
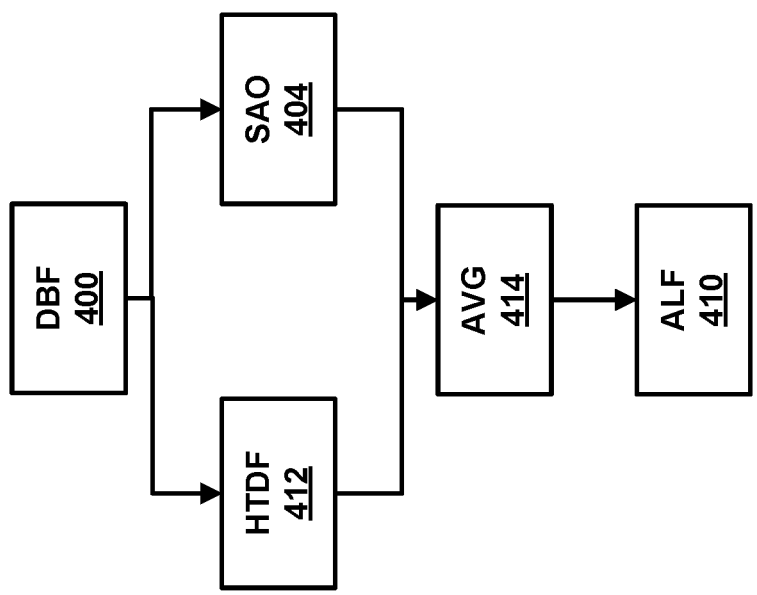
FIG. 5A is a conceptual diagram illustrating a combination of a Hadamard transform domain filter (HTDF) and a SAO filter.

FIG. 5A is a conceptual diagram illustrating a combination of a Hadamard transform domain filter (HTDF) and a SAO filter. In Ikonin et al., "Non-CE5: Hadamard transform domain in-loop filter," Joint Video Experts Team (WET) of ITU-T SG 16 WP 3 and ISO/IEC JTC 1/SC 29/WG 11, 15$^{th}$ meeting, Gothenburg, SE, 3-12 Jul. 2019, document no. JVET-O1120, (hereinafter, "JVET-O1120"), a Hadamard transform domain filter 412 (HTDF) is applied in parallel with an SAO, such as SAO 404, as shown in FIG. 5A. For example, video encoder 200 or video decoder 300 may apply HTDF 412 in parallel with SAO 404 on the output of deblocking filter (DBF) 400. The output of HTDF 412 and SAO 404 may be averaged by an averager, AVG 414. ALF 410 may further filter the output of AVG 414.

FIG. 5B is a conceptual diagram illustrating a combination of HTDF and BIF. HTDF 412 and BIF 402 may also be applied in parallel as shown in FIG. 5B. For example, video encoder 200 and video decoder 300 may apply HTDF 412 and BIF 402 in parallel to the output of DBF 400. The output of HTDF 412 and BIF 402 may be averaged by AVG 414. ALF 410 may further filter the output of AVG 414.

Figure 6:
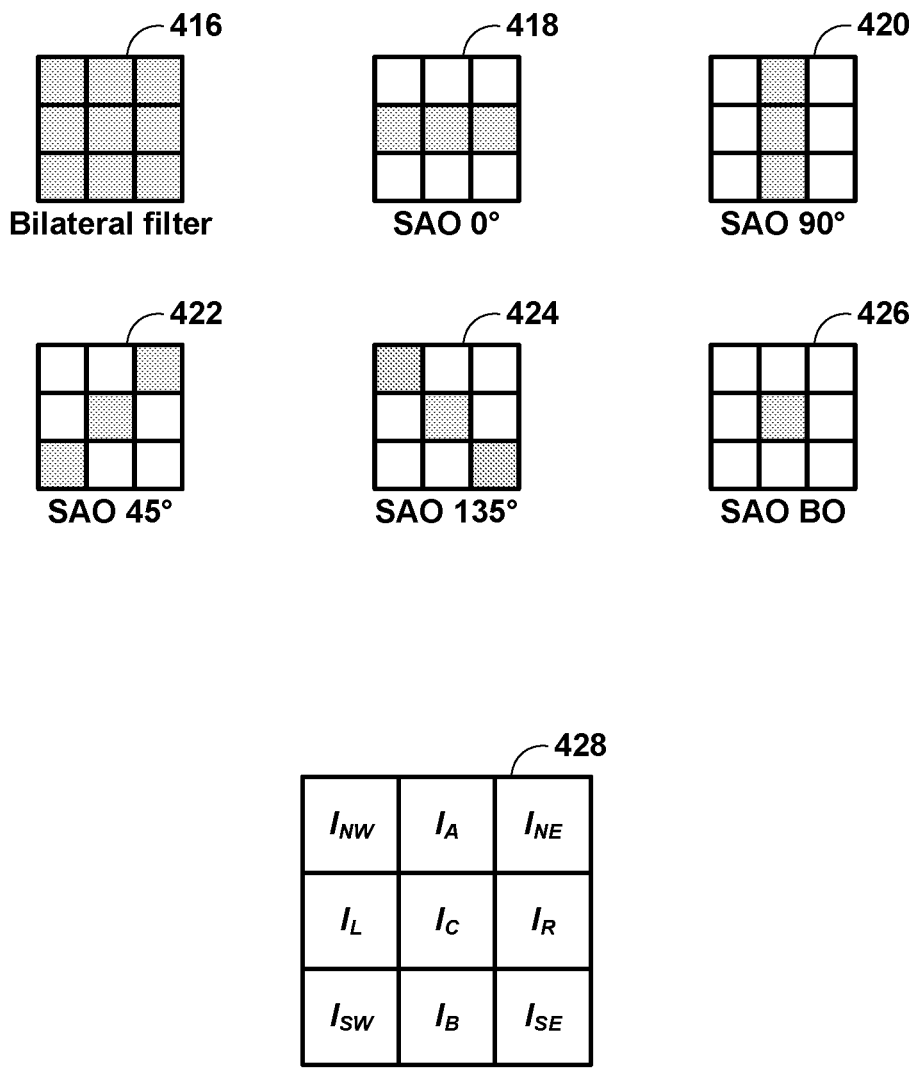
FIG. 6 is a conceptual diagram illustrating a 3×3 pixel pattern for BIF and SAO.

FIG. 6 is a conceptual diagram illustrating 3×3 pixel patterns for BIF and SAO. In the example of FIG. 6, the center pixel in each block is a current-to-be filtered pixel and the shaded pixels represent pixels used in a filter for the current-to-be filtered pixel. For example, block 416 represents a 3×3 pixel pattern for BIF. Block 418 represents a 3×3 pixel pattern for a 0 degree SAO. Block 420 represents a 3×3 pixel pattern for a 90 degree SAO. Block 422 represents a 3×3 pixel pattern for a 45 degree SAO. Block 424 represents a 3×3 pixel pattern for a 135 degree SAO. Block 426 represents a 3×3 pixel pattern for a band offset (BO) SAO.

Filter unit 216 of video encoder 200 or filter unit 312 of video decoder 300 may perform filtering of a sample with the help of 8-neighbors as shown in FIG. 6. In block 428 of FIG. 6, the sample to be filtered is denoted $I_C$ for "center intensity", $I_R$ denotes the sample to the right, $I_L$ the one to the left, and $I_A$ and $I_B$ denotes the samples above and below respectively. Furthermore, cardinal directions are used to denote the diagonal neighbors. Hence $I_{NW}$ is short for "north-west" and denotes the sample one step up (one above) and one step to the left, etc.

Figure 7:
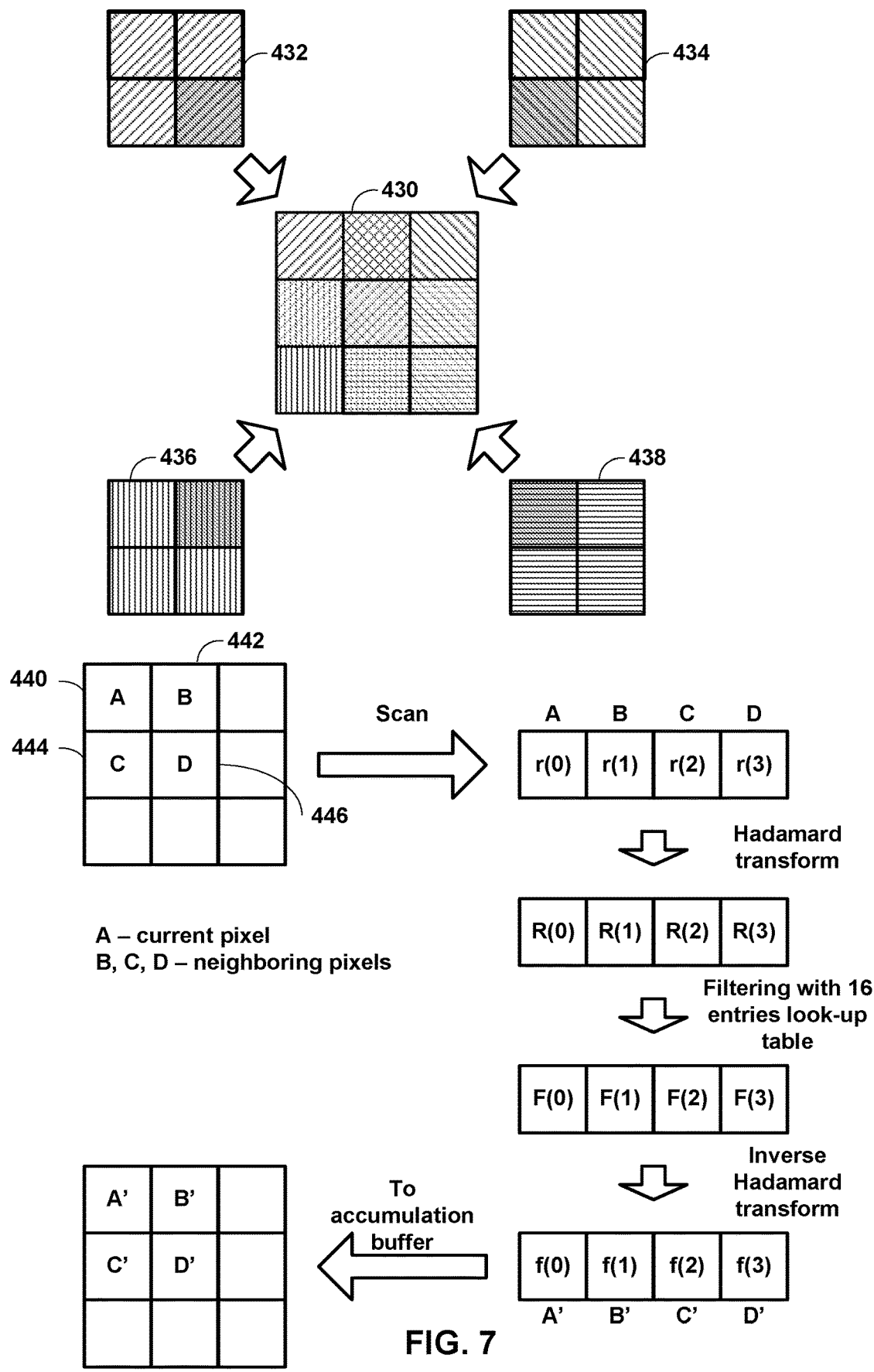
FIG. 7 is a conceptual diagram illustrating a 3×3 pixel pattern for HTFD.

FIG. 7 is a conceptual diagram illustrating an example filtering process and filter shape. An equivalent filter shape is 3×3 pixels as depicted in block 430 of FIG. 7. It can be seen that all pixels in block 430 can be processed independently in case maximum parallelism is required or desired. It should also be noted that results of the 2×2 groups of filtering (432, 434, 436 and 438) are reused for spatially collocated samples. Generally, each new pixel in the block 430 requires one 2×2 filtering, with the other three pixels being reused.

The HTDF filtering process is also schematically presented in FIG. 7. For example, D denotes a current pixel 446. A, B, and C represent neighboring pixels 440, 442, and 444, respectively, of current pixel 446 (A, B, and C all being neighboring pixels of D). A video coder (e.g., video encoder 200) may scan for neighboring pixels and read pixels A, B, C, and D (represented as r(0), r(1), r(2), and r(3)). The video coder may Hadamard transform the read pixels to create R(0), R(1), R(2), and R(3). The video coder may filter the transformed pixels by using a 16-entry lookup table, for example, to create F(0), F(1), F(2), and F(3). The video coder may inverse Hadamard transform the filtered pixels to create f(0), f(1), f(2), and f(3) which are also represented by A', B', C', and D'. The video coder may place the pixels A', B', C', and D' in an accumulation buffer in the positions originally occupied by pixels A, B, C, and D, respectively.

Taking the right neighbor $I_R$ as an example, a video coder, such as video encoder 200 or video decoder 300, may calculate the downshifted difference $\Delta I_R$ against the center sample $I_C$:

$$\Delta I_R = (I_R - I_C + 4) >> 3 \quad \text{(Eqn 1)}$$

The downshifted difference value may be used to obtain a modifier value $m_R$ using a look-up table (LUT). In some examples, only positive values are stored in the LUT; so if the value is negative, the video coder may negate the value of the LUT output. Furthermore, since it is difficult to implement look-up tables longer than 16 items long using single instruction, multiple data (SIMD) instructions, the video coder, e.g., video encoder 200 or video decoder 300, may clamp the value at 15:

$$cI_R = \min(15, |\Delta I_R|) \quad \text{(Eqn 2)}$$

$$m_R = \begin{cases} LUT(cI_R) & \text{if } \Delta I_R \geq 0 \\ -LUT(cI_R) & \text{otherwise} \end{cases} \quad \text{(Eqn 3)}$$

In the above equations, $cI_R$ represents the clamped value of $\Delta I_R$. The modifier value $m_B$ for the neighbor below may be calculated analogously. The LUT used depends on the qp (quantization parameter):

LUT={0,4,4,4,3,2,1,2,1,1,1,1,0,1,1,−1} if 17<qp≤22

LUT={0,8,11,11,7,5,5,4,5,4,4,2,2,2,2,−2} if 22<qp≤27

LUT={0,9,16,19,22,22,20,15,12,12,11,9,9,7,8,−3} if 27<qp≤32

LUT={0,12,21,28,33,36,40,40,40,36,29,22,19,17,15,−3} if 32<qp≤37

LUT={0,17,23,33,37,41,44,44,45,44,42,27,22,17,15,−3} if qp>37 (Eqn 4)

For the diagonal neighbors, the video coder, e.g., video encoder 200 or video decoder 300, may use an extra shift by one to compensate for the fact that a diagonal neighbor is farther from the center than a neighbor to the right or below:

$$\Delta I_{SW} = (I_{SW} - I_C + 4) >> 3 \quad \text{(Eqn 5)}$$

$$cI_{SW} = \min(15, |\Delta I_{SW}|) \quad \text{(Eqn 6)}$$

$$m_{SW} = \begin{cases} LUT(cI_{SW}) >> 1 & \text{if } \Delta I_R \geq 0 \\ -LUT(cI_{SW}) >> 1 & \text{otherwise} \end{cases} \quad \text{(Eqn 7)}$$

Having calculated $m_R$, $m_B$, $m_{SW}$ and $m_{SE}$ for the current sample, and retrieved $m_A$, $m_L$, $m_{NW}$ and $m_{NE}$ from previously filtered neighbors, the video coder can now form the sum of the modifier values.

$$m_{sum} = m_A + m_B + m_L + m_R + m_{NW} + m_{NE} + m_{SW} + m_{SE}. \quad \text{(Eqn 8)}$$

For small intra blocks, a video coder, such as video encoder 200 or video decoder 300, may filter more strongly, which corresponds to an $m_{sum}$ value of larger magnitude. For large blocks, a video coder, such as video encoder 200 or video decoder 300, may filter more weakly. This can be achieved by calculating a corrected modifier value $$cm_{sum} = (k_1 \& (m_{sum} << 1) + k_2 \& m_{sum}) >> 1, \quad \text{(Eqn 9)}$$

where $k_1$ and $k_2$ are one-bit numbers and the & operator calculates logical AND between the left operand and all the bits of the right operand. Setting $k_1$ and $k_2$ according to Table 1 provides the listed effective strengths.

TABLE 1

Using the listed combinations of $k_1$ and $k_2$ it is possible to increase the filtering strength for small intra blocks and decrease it for large inter blocks.

| | D = min (block$_{width}$, block$_{height}$) | | |
|---|---|---|---|
| | D ≤ 4 | 4 < D < 16 | D ≥ 16 |
| intra block | $k_1 = 1$, $k_2 = 1$ strength = 1.5 | $k_1 = 1$, $k_2 = 0$ strength = 1 | $k_1 = 0$, $k_2 = 1$ strength = 0.5 |
| inter block | $k_1 = 1$, $k_2 = 0$ strength = 1 | $k_1 = 1$, $k_2 = 0$ strength = 1 | $k_1 = 0$, $k_2 = 1$ strength = 0.5 |

In software, Equation 9 above is likely more efficiently implemented using a multiplication $cm_{sum} = (k*m\_sum) >> 1$, where k=1, 2 or 3, since multiplications are very inexpensive on modern CPUs.

The filtered sample $I_F$ of BIF is finally computed as $$I_F = I_C + ((cm_{sum} + 4) >> 3) \quad \text{(Eqn 10)}$$

The filter parameters of HTDF are explicitly derived from the coded information and filtering process as follows. For each pixel from a reconstructed block, video encoder 200 (e.g., in the reconstruction loop) or video decoder 300 may perform pixel processing operations that comprise the following steps:

Scan for 4 neighboring pixels around processing pixel including a current pixel according to a scan pattern Perform a 4 point Hadamard transform of read pixels Perform spectrum filtering based on the following formula:

$$F(i, \sigma) = \frac{R(i)^2}{R(i)^2 + m * \sigma^2} * R(i)$$

wherein (i) is an index of a spectrum component in Hadamard spectrum, R(i) is a spectrum component of reconstructed pixels corresponding to the index, m=4 is a normalization constant equal to the number of spectrum components, and σ is a filtering parameter derived from a codec quantization parameter QP using the following equation:

$$\sigma = 2.64 * 2^{(0.1269 * (QP-))}$$

The first spectrum component corresponding to a DC value may be bypassed without filtering. For example, a video coder may do the following:

Perform an inverse 4 point Hadamard transform of filtered spectrum

After the inverse 4 point Hadamard transform step, place the filtered pixels in their original positions into an accumulation buffer.

After completing filtering of the pixels, normalize the accumulated values by the number of processing groups used for each pixel filtering. Due to use of padding of one sample around the block, the number of processing groups is equal to 4 for each pixel in the block and normalization is performed by right shifting on 2 bits.

Figure 8:
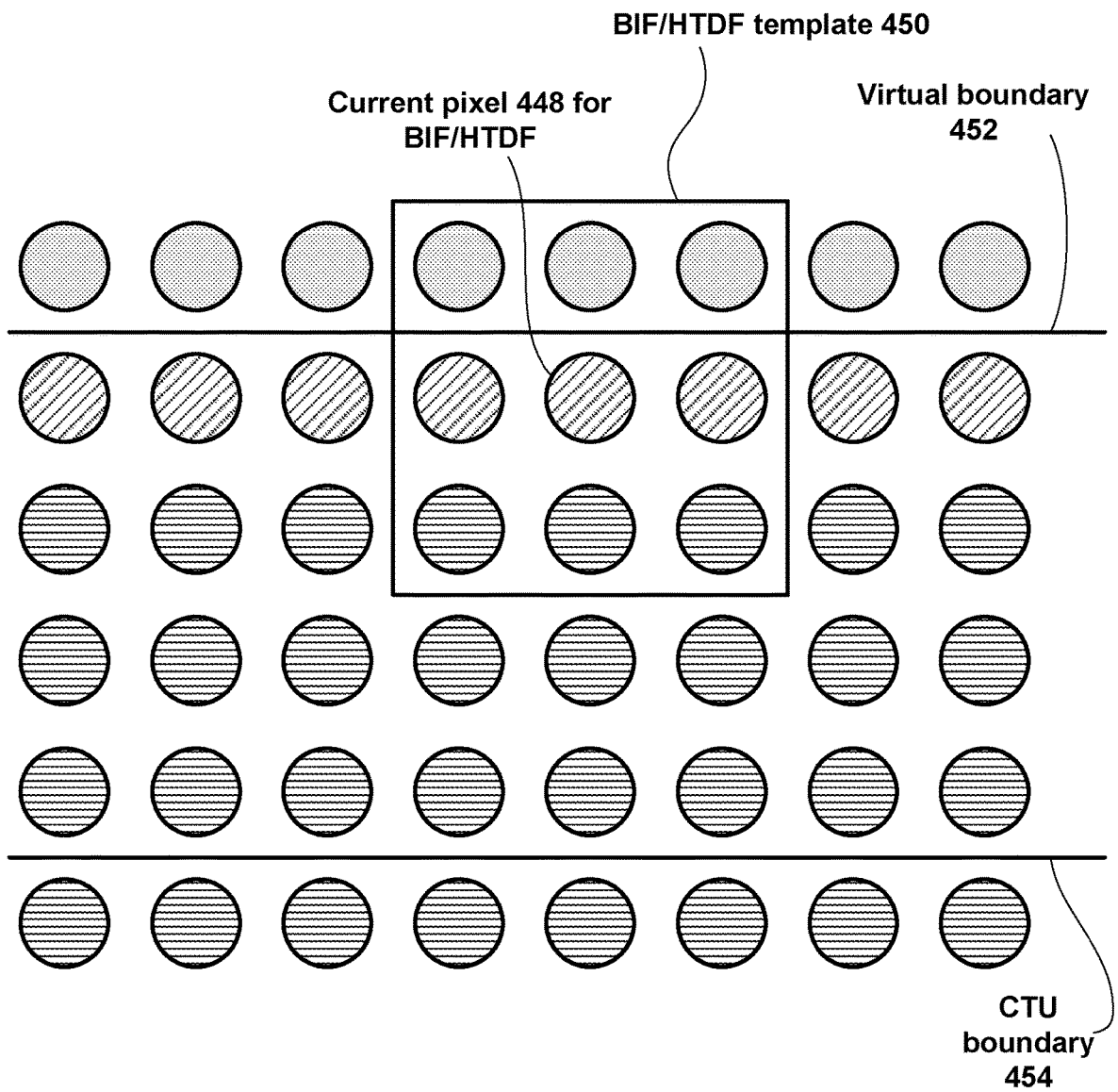
FIG. 8 is a conceptual diagram illustrating a line buffer.

However, when a current to-be-filtered pixel requires pixels beyond a boundary (such as picture boundary or a sub-picture boundary), the behavior is not defined, for example, by some video coding standards, such as VVC. As used herein, a "current to-be-filtered pixel" is a pixel that may or may not be filtered. In VVC Draft 6, for a luma component, 4 lines of luma samples above the current CTU are stored. These 4 lines are called the line buffer. FIG. 8 is a conceptual diagram illustrating a line buffer. In FIG. 8, the circles between CTU boundary 454 and virtual boundary 452 represent the pixels stored in the line buffer of VVC Draft 6. As used herein, a virtual boundary may be a line buffer boundary. In FIG. 8, circles correspond to pixels. More specifically, in FIG. 8, circles with horizontal stripes correspond to pixels that are waiting for deblocking. In FIG. 8, circles with diagonal stripes correspond to pixels that are waiting for SAO. When BIF is applied in the way of FIG. 4 and FIG. 5B, the pixels corresponding to diagonally striped circles are waiting for BIF/HTDF and/or SAO, and the pixels corresponding to diagonally striped circles may require the pixels corresponding to the gray-shaded circles as for BIF/HTDF. This extra line buffer of pixels corresponding to the gray-shaded circles is not desired. BIF/HTDF template 450 is shown for current to-be-filtered pixel 448 awaiting BIF/HTDF.

Figure 9:
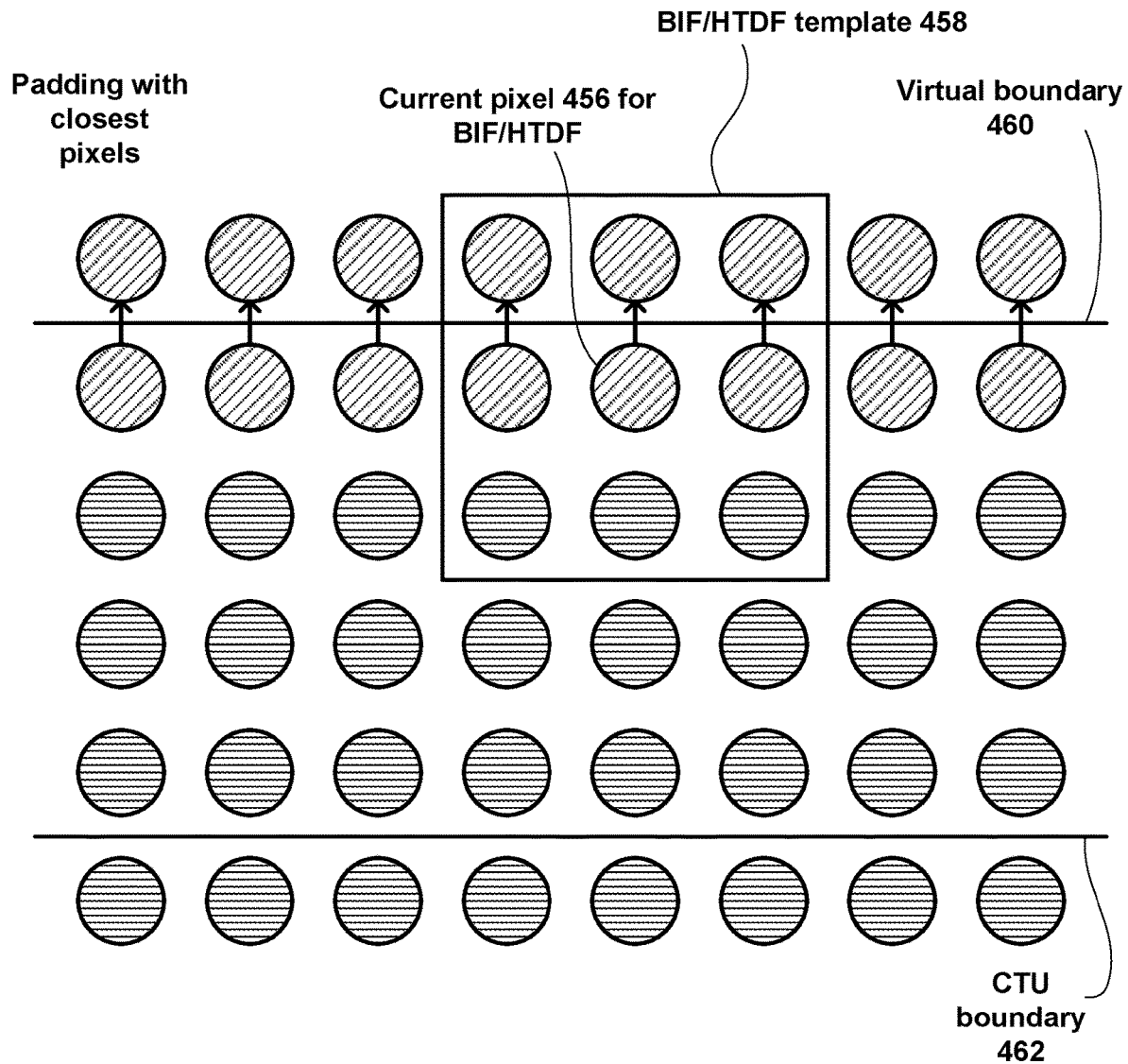
FIG. 9 is a conceptual diagram illustrating closest padding.

Two example padding methods which may be used by a video coder include closest padding and mirrored padding. FIG. 9 is a conceptual diagram illustrating closest padding. In FIG. 9, pixels in the line buffer are represented by pixels between virtual boundary 460 and CTU boundary 462. The current to-be-filtered pixel is represented by pixel 456 and the filter template 458 for pixel 456 is shown. In closest padding, such as in FIG. 9, an unavailable pixel (e.g., a pixel corresponding to a circle above virtual boundary 460) may be replaced by the closest available pixel (e.g., a pixel below virtual boundary 460). For example, video encoder 200 or video decoder 300 may use values of pixels in the row containing current to-be-filtered pixel 456 as values of pixels in the row above the current to-be-filtered pixel as shown in FIG. 9 in filter template 458.

Figure 10:
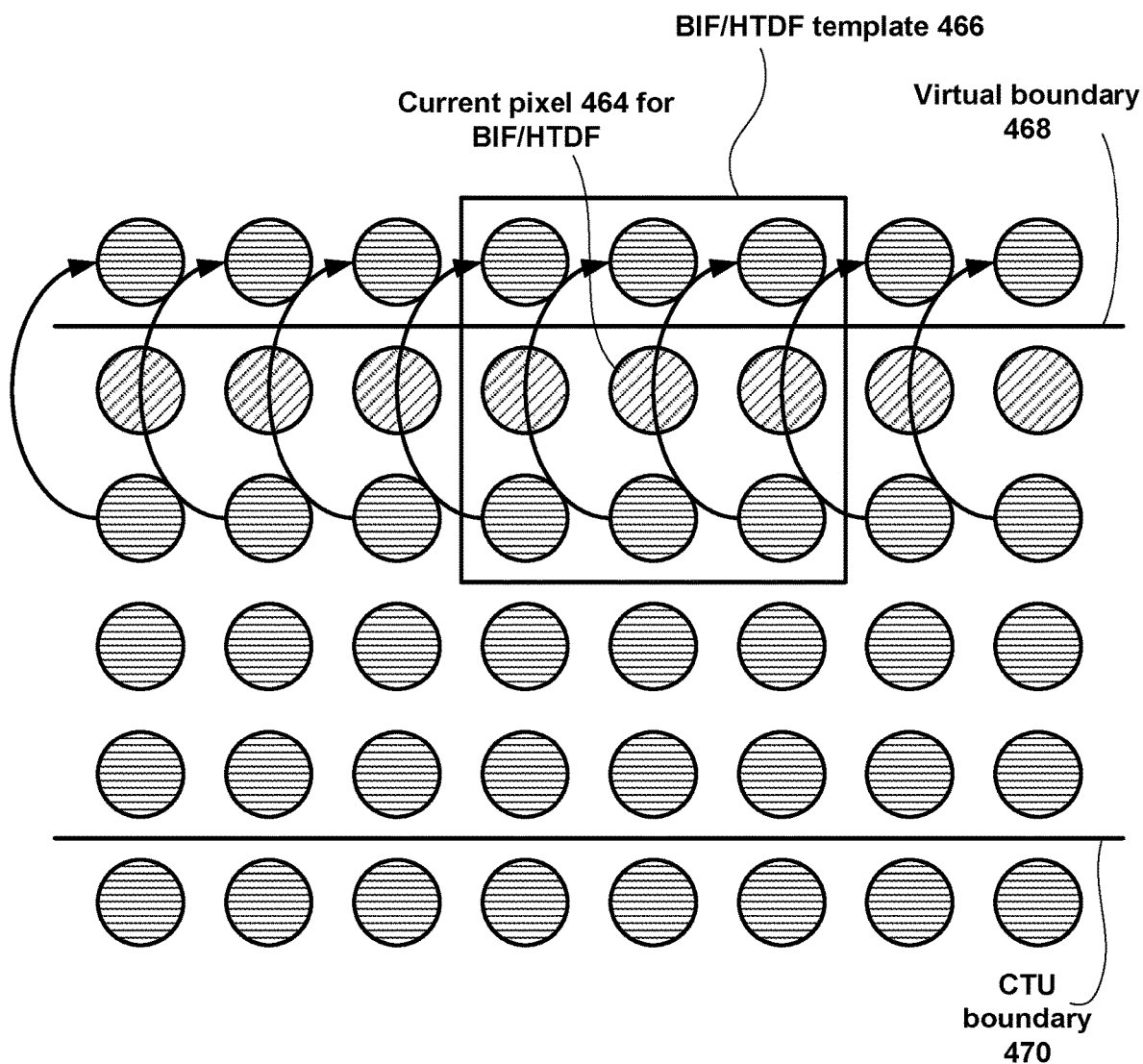
FIG. 10 is a conceptual diagram illustrating mirrored padding.

FIG. 10 is a conceptual diagram illustrating mirrored padding. In FIG. 10, pixels in the line buffer are represented by pixels between virtual boundary 468 and CTU boundary 470. The current to-be-filtered pixel is represented by pixel 464 and the filter template 466 for pixel 464 is shown. In mirrored padding, such as in FIG. 10, an unavailable pixel (e.g., a pixel corresponding to a circle above virtual boundary 468) may be replaced by a vertical mirrored pixel. For example, video encoder 200 or video decoder 300 may use values of pixels in the row below the current to-be-filtered pixel as values of pixels in the row above the current to-be-filtered pixel as shown in FIG. 10 in filter template 466.

As used herein, the location (xCtb, yCtb) specifies the top-left sample of the current coding tree block (CTB) relative to the top-left sample of the current picture, and nCtbSw specifies CTB width and nCtbSh specifies CTB height.

pps_loop_filter_across_virtual_boundaries_disabled_flag equal to 1 specifies that the in-loop filtering operations are disabled across the virtual boundaries in pictures referring to the PPS. pps_loop_filter_across_virtual_boundaries_disabled_flag equal to 0 specifies that no such disabling of in-loop filtering operations is applied in pictures referring to the PPS. In some examples, the in-loop filtering operations include the deblocking filter, sample adaptive offset filter, and adaptive loop filter operations.

The sample locations inside the current CTB may be derived as follows:

$$(xSi, ySj) = (xCtb+i, yCtb+j)$$

For all sample locations (xSi, ySj) with i=0 . . . nCtbSw−1 and j=0 . . . nCtbSh−1.

The following examples may be applied separately or in any combination.

For example, when cu_transquant_bypass_flag of a current block is true (e.g., transform and quantization are not applied to the current block), BIF and HTDF are not applied. For example, video encoder 200 or video decoder 300 may determine whether a transform and quantization are applied to the current block, and based on the transform and quantization not being applied to the current block, filter unit 216 of video encoder 200 or filter unit 312 of video decoder 300 may not apply BIF and HTDF. Conversely, when cu_transquant_bypass_flag is false (e.g., transform and quantization are applied to the current block), BIF and HTDF may be applied. For example, video encoder 200 or video decoder 300 may determine whether a transform and quantization are applied to the current block, and based on the transform and quantization being applied to the current block, filter unit 216 of video encoder 200 or filter unit 312 of video decoder 300 may apply BIF and HTDF.

In some examples, if a current to-be-filtered pixel requires a pixel on the other side (e.g., on the opposite side from the current to-be-filtered pixel) of a virtual boundary (or a so called line buffer boundary, which may be 4 luma samples or 2 chroma samples above a horizontal CTU boundary in VVC and HEVC), BIF and HTDF are not applied to the current to-be-filtered pixel. For example, video encoder 200 or video decoder 300 may determine whether a current to-be-filtered pixel requires a pixel on another side of a virtual boundary (e.g., on an opposite side of the virtual boundary than the current to-be-filtered pixel) for a filter template. Based on the current to-be-filtered pixel requiring a pixel on another side of the virtual boundary for the filter template, filter unit 216 of video encoder 200 and filter unit 312 of video decoder 300 may not apply BIF or HTDF to the current to-be-filtered pixel. Video encoder 200 or video decoder 300 may code the current to-be-filtered pixel without applying BIF or HTDF. In some examples, video encoder 200 or video decoder 300 may further determine whether a pps_loop_filter_across_virtual_boundaries_disabled_flag is 1 and not apply BIF or HTDF further based on the pps_loop_filter_across_virtual_boundaries_disabled_flag being 1

Alternatively, padding could be applied, for example, by filter unit 216 of video encoder 200 and filter unit 312 of video decoder 300, to the filter template. Video encoder 200 or video decoder 300 may code the current to-be-filtered pixel based on the filter template.

In one example, if there are neighbor pixels in the filter template located on the other side of a vertical boundary (e.g., on an opposite side of the virtual boundary than the current to-be-filtered pixel), video encoder 200 or video decoder 300 may apply closest padding or mirrored padding to address those pixels on the other side of the vertical boundary. After applying the padding, if there are neighbor pixels in the filter template located on the other side of a horizontal boundary, video encoder 200 or video decoder 300 may apply closest padding or mirrored padding to address those neighboring pixels on the other side of the horizontal boundary.

Alternatively, if there are neighbor pixels in the filter template located on the other side of a horizontal boundary, video encoder 200 or video decoder 300 may apply closest padding or mirrored padding to address those pixels on the other side of the horizontal boundary. After applying the padding, if there are neighbor pixels in the filter template located on the other side of a vertical boundary, video encoder 200 or video decoder 300 may apply closest padding or mirrored padding to address those pixels on the other side of the vertical boundary.

In another example, rather than applying padding, filter unit 216 of video encoder 200 and filter unit 312 of video decoder 300 may apply a partial filter template and renormalize a filter output based on the number of available neighbor pixels.

Figure 11A:
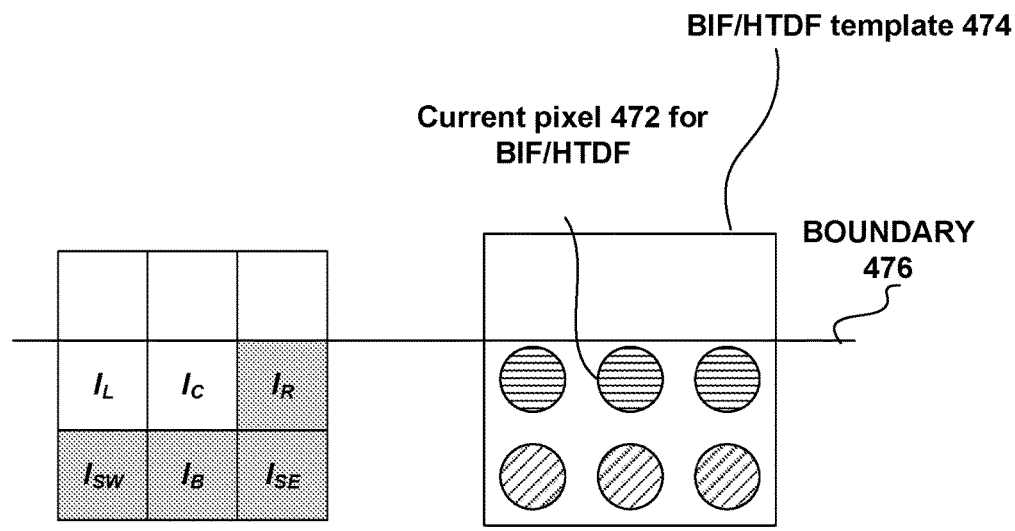
FIG. 11A is a conceptual diagram illustrating a partial template example with only one boundary where 5 neighbor pixels are used.

FIG. 11A is a conceptual diagram illustrating a partial template example with only one boundary where 5 neighbor pixels are used in the filter template. In FIG. 11A BIF/HTDF filter template 474 is shown for current to-be-filtered pixel 472. Boundary 476 is also shown. For example, if only 5 neighbor pixels on the same side of boundary 476 as current to-be-filtered pixel may be used, as shown FIG. 11A as an example, for BIF, m_sum in (Eqn 8) can be renormalized by filter unit 216 of video encoder 200 or filter unit 312 of video decoder 300, for example, as $m_{sum} = m_{sum} * 2$ or $$m_{sum} = \frac{m_{sum}}{5} * 8$$

or $I_F$ in (Eqn 10) may be renormalized as $I_F = I_C + ((cm_{sum} + 2) >> 2)$. For HTDF, normalization may be performed by right shifting on 1 bit instead of 2 bits.

Figure 11B:
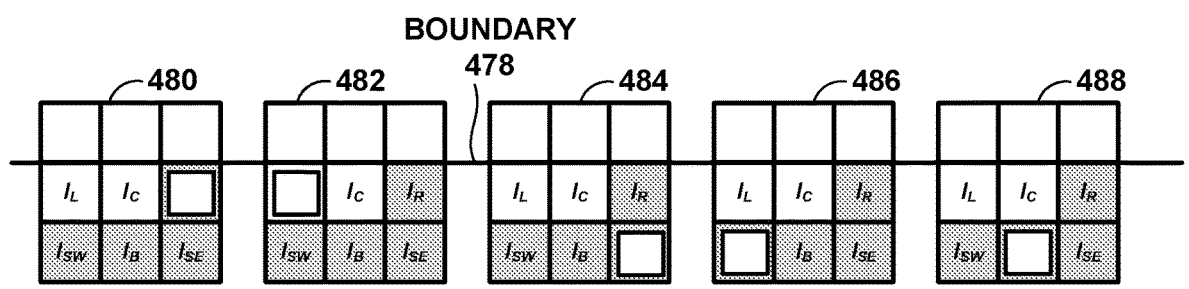
FIG. 11B is a conceptual diagram illustrating an alternative partial template example with only one boundary for BIF where 4 neighbor pixels are used.

FIG. 11B is a conceptual diagram illustrating an alternative partial template examples with only one boundary for BIF where 4 neighbor pixels are used. FIG. 11B shows boundary 478 and several example blocks 480, 482, 484, 486 and 488 where four neighboring pixels to a current to-be-filtered pixel $I_c$ are on the same side of boundary 478 as the current to-be-filtered pixel $I_c$. In the examples of FIG. 11B, the block shown over a given pixel represents that the pixel that would be at that location is not used in the filter template.

If only 4 neighbor pixels on the same side of the boundary as current to-be-filtered pixel may be used, as shown in FIG. 11B as an example, then for BIF, m_sum in (Eqn 8) may be renormalized by filter unit 216 of video encoder 200 and filter unit 312 of video decoder 300, for example, as $m_{sum} = m_{sum} * 2$ or $I_F$ in (Eqn 10) may be renormalized as $I_F = I_C + ((cm_{sum} + 2) >> 2)$.

Figure 11C:
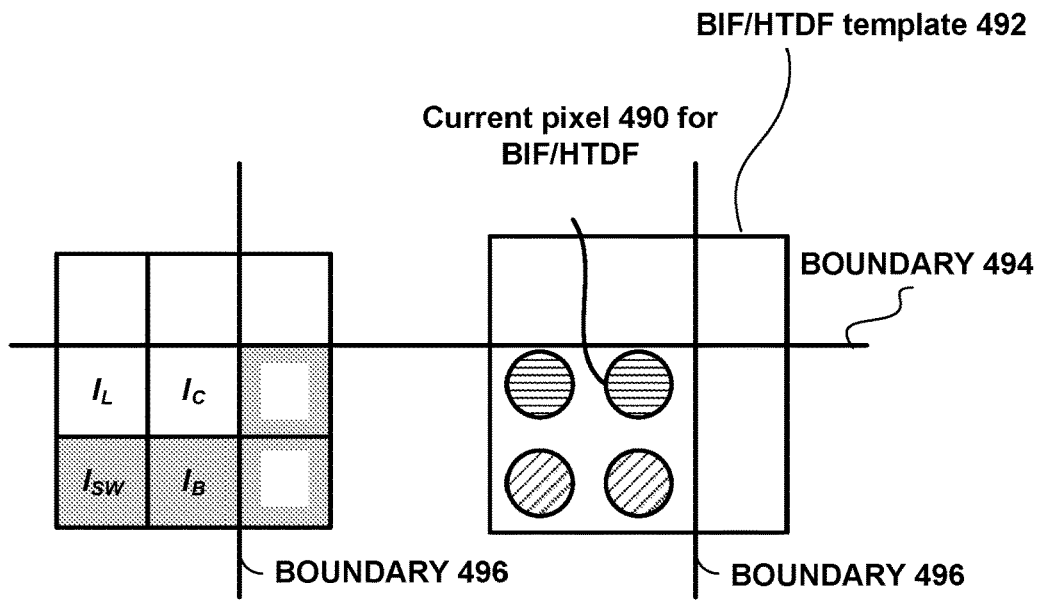
FIG. 11C is a conceptual diagram illustrating a partial template example with two boundaries where only 3 neighbor pixels are used.

FIG. 11C is a conceptual diagram illustrating a partial template example with two boundaries where only 3 neighbor pixels are used. FIG. 11C shows a BIF/HTDF template 492 for a current to-be-filtered pixel 490. FIG. 11C also depicts two boundaries, namely boundary 494 and boundary 496. The boxes over the location of where $I_R$ and $I_{SE}$ are shown represent that these pixels are unavailable.

In this example, only 3 neighbor pixels on the same side of two boundaries, such as boundary 494 and boundary 496, as current to-be-filtered pixel may be used, as shown FIG. 11C. In this example, for BIF, $m_{sum}$ in (Eqn 8) can be renormalized, for example, by filter unit 216 of video encoder 200 and filter unit 312 of video decoder 300, as $$m_{sum} = \frac{m_{sum}}{3} * 8$$

or $I_F$ in (Eqn 10) may be renormalized as $I_F = I_C + ((cm_{sum} + 2) >> 2)$. For HTDF, normalization may not be applied.

In another example, when loop filter across a sub-picture is disabled, if a current to-be-filtered pixel requires a pixel in a different sub-picture, filter unit 216 of video encoder 200 and filter unit 312 of video decoder 300, for example, may not apply BIF and HTDF to the current to-be-filtered pixel. In some examples, a sub-picture may include a slice, a tile, a tile group, or a brick. For example, video encoder 200 or video decoder 300 may determine whether loop filtering across sub-pictures is disabled. Video encoder 200 or video decoder 300 may also determine whether a current-to-be filtered pixel requires, in a pixel template, a pixel located in a different sub-picture then a sub-picture in which the current to-be-filtered pixel is located. Based on loop filtering across sub-pictures being disabled and the current to-be filtered pixel requiring a pixel in a different sub-picture for a filter template, filter unit 216 of video encoder 200 or filter unit 312 of video decoder 300 may not apply BIF or HTDF to the current to-be-filtered pixel. Video encoder 200 or video decoder 300 may code the current to-be-filtered pixel without applying BIF or HTDF.

Alternatively, filter unit 216 of video encoder 200 and filter unit 312 of video decoder 300, for example, may apply padding to the filter template. Video encoder 200 or video decoder 300 may code the current to-be-filtered pixel based on the padded filter template.

In some examples, filter unit 216 of video encoder 200 and filter unit 312 of video decoder 300 may apply padding in the following manner. If there are neighbor pixels in the filter template located on the other side of a vertical boundary, then closest padding or mirrored padding may be applied. After applying padding, if there are neighbor pixels in the filter template located on the other side of a horizontal boundary, then closest padding or mirrored padding may be applied.

Alternatively, filter unit 216 of video encoder 200 and filter unit 312 of video decoder 300 may apply padding in the following manner. If there are neighbor pixels in the filter template located on the other side of a horizontal boundary, then closest padding or mirrored padding may be applied. After applying padding, if there are neighbor pixels in the filter template located on the other side of a vertical boundary, then closest padding or mirrored padding may be applied.

Alternatively, filter unit 216 of video encoder 200 and filter unit 312 of video decoder 300 may apply partial filter templates and renormalize the filter output depending on the number of available neighbor pixels. Video encoder 200 or video decoder 300 may code the current to-be-filtered pixel based on the renormalized filter output.

If only 5 neighbor pixels on the same side of the boundary as a current to-be-filtered pixel may be used, as shown FIG. 11A, as an example, filter unit 216 of video encoder 200 and filter unit 312 of video decoder 300 may renormalize BIF and normalize HTDF as follows. For BIF, $m_{sum}$ in (Eqn 8) may be renormalized by filter unit 216 of video encoder 200 and filter unit 312 of video decoder 300, for example, as $m_{sum}=m_{sum}*2$ or $$m_{sum} = \frac{m_{sum}}{5} * 8$$

or $I_F$ in (Eqn 10) may be renormalized as $I_F=I_C+((cm_{sum}+2)>>2)$. For HTDF, normalization is performed by right shifting on 1 bit instead of 2 bits.

In another example, for BIF, if only 4 neighbor pixels on the same side of the boundary as current to-be-filtered pixel may be used, as shown in FIG. 11B as an example, $m_{sum}$ in (Eqn 8) may be renormalized by filter unit 216 of video encoder 200 and filter unit 312 of video decoder 300, for example, as $m_{sum}=m_{sum}*2$ or $I_F$ in (Eqn 10) may be renormalized as $I_F=I_C+((cm_{sum}+2)>>2)$.

In another example, only 3 neighbor pixels on the same side of the two boundaries as current to-be-filtered pixel may be used, as shown FIG. 11C. For BIF, $m_{sum}$ in (Eqn 8) may be renormalized by filter unit 216 of video encoder 200 and filter unit 312 of video decoder 300, for example, as $$m_{sum} = \frac{m_{sum}}{3} * 8$$

or $I_F$ in (Eqn 10) may be renormalized as $I_F=I_C+((cm_{sum}+2)>>2)$. For HTDF, normalization may not be applied.

In yet another example, if a current to-be-filtered pixel requires a pixel beyond a picture boundary, filter unit 216 of video encoder 200 and filter unit 312 of video decoder 300, for example, may not apply BIF and HTDF to the current pixel. For example, video encoder 200 or video decoder 300 may determine whether a current to-be-filtered pixel requires a pixel beyond a picture boundary for a filter template. Based on the current to-be-filtered pixel requiring a pixel beyond the picture boundary for the filter template, video encoder 200 or video decoder 300 may code the current to-be-filtered pixel without applying BIF or HTDF.

Alternatively, filter unit 216 of video encoder 200 or filter unit 312 of video decoder 300 may apply padding to the filter template. Video encoder 200 or video decoder 300 may code the current to-be-filtered pixel based on the padded filter template.

One way in which filter unit 216 of video encoder 200 and filter unit 312 of video decoder 300, for example, could apply padding is as follows. If there are neighbor pixels in the filter template located on the other side of a vertical boundary, then closest padding or mirrored padding may be applied. After applying padding, if there are neighbor pixels in the filter template located on the other side of a horizontal boundary, then closest padding or mirrored padding may be applied.

Alternatively, another way in which filter unit 216 of video encoder 200 and filter unit 312 of video decoder 300, for example, could apply padding is as follows. If there are neighbor pixels in the filter template located on the other side of a horizontal boundary, then closest padding or mirrored padding may be applied. After applying padding, if there are neighbor pixels in the filter template located on the other side of a vertical boundary, then closest padding or mirrored padding may be applied.

Alternatively, filter unit 216 of video encoder 200 and filter unit 312 of video decoder 300, for example, may apply partial filter template and renormalize depending on the number of available neighbor pixels. Video encoder 200 or video decoder 300 may code the current to-be-filtered pixel based on the renormalized filter output.

For example, only 5 neighbor pixels on the same side of the boundary as current to-be-filtered pixel may be used, as shown FIG. 11A as an example. In this case, for BIF, $m_{sum}$ in (Eqn 8) may be renormalized by filter unit 216 of video encoder 200 and filter unit 312 of video decoder 300, for example, as $m_{sum}=m_{sum}*2$ or $$m_{sum} = \frac{m_{sum}}{5} * 8$$

or $I_F$ in (Eqn 10) may be renormalized as $I_F=I_C+((cm_{sum}+2)>>2)$. For HTDF, normalization is performed by right shifting 1 bit instead of 2 bits.

Alternatively, for BIF, if only 4 neighbor pixels on the same side of the boundary as current to-be-filtered pixel may be used, as shown in FIG. 11B as an example. $m_{sum}$ in (Eqn 8) may be renormalized by filter unit 216 of video encoder 200 and filter unit 312 of video decoder 300, for example, as $m_{sum}=m_{sum}*2$ or $I_F$ in (Eqn 10) may be renormalized as $I_F=I_C+((cm_{sum}+2)>>2)$.

Alternatively, only 3 neighbor pixels on the same side of the two boundaries as a current to-be-filtered pixel may be used, as shown FIG. 11C as an example. For BIF, $m_{sum}$ in (Eqn 8) may be renormalized by filter unit 216 of video encoder 200 and filter unit 312 of video decoder 300, for example, as $$m_{sum} = \frac{m_{sum}}{3} * 8$$

or $I_F$ in (Eqn 10) may be renormalized as $I_F=I_C((cm_{sum}+2)>>2)$. For HTDF, normalization may not be applied.

Figure 12:
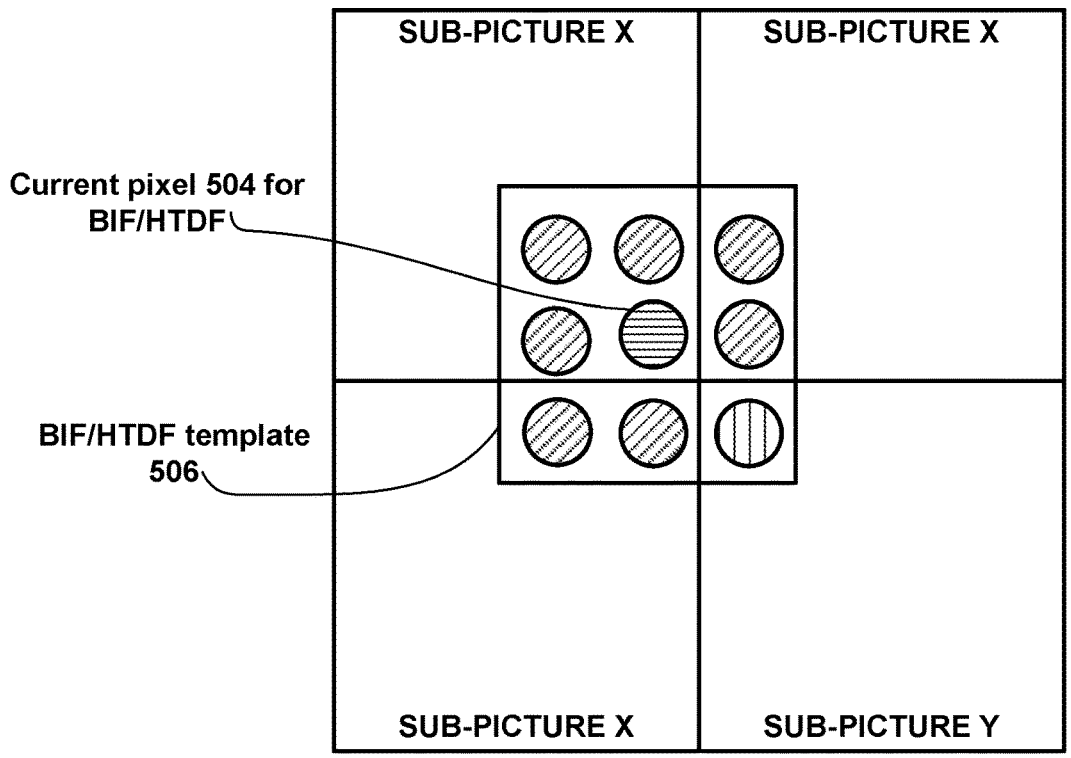
FIG. 12 is a conceptual diagram illustrating only one neighbor CTU in a different sub-picture.

FIG. 12 is a conceptual diagram illustrating only one neighbor CTU in a different sub-picture. In the example of FIG. 12, current to-be-filtered pixel 504 is shown in BIF/HTDF template 506. When loop filter across sub-pictures is disabled, if a current to-be-filtered pixel located at the corner of a L-shaped raster-scanned sub-picture (as shown in FIG. 12) requires a pixel on the other size of a sub-picture boundary, filter unit 216 of video encoder 200 and filter unit 312 of video decoder 300, for example, may not apply BIF and HTDF to the current to-be-filtered pixel. For example, video encoder 200 or video decoder 300 may determine whether loop filtering across sub-pictures is disabled. Video encoder 200 or video decoder 300 may also determine whether the current-to be filtered pixel is located at the corner of an L-shaped raster-scanned sub-picture. Based on loop filtering across sub-pictures being disabled and the current to-be filtered pixel being located at the corner of an L-shaped raster-scanned sub-picture, filter unit 216 of video encoder 200 or filter unit 312 of video decoder 300 may not apply BIF or HTDF to the current to-be-filtered pixel. Video encoder 200 or video decoder 300 may code the current to-be-filtered pixel without applying BIF or HTDF.

Figure 13:
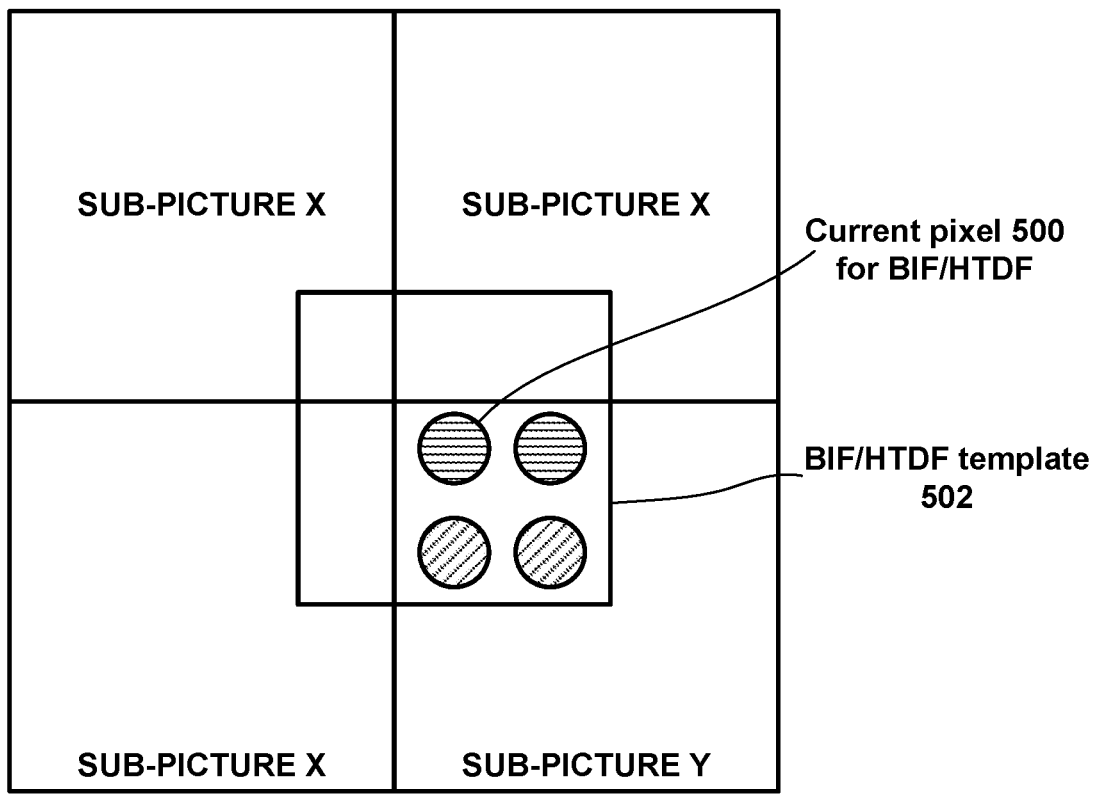
FIG. 13 is a conceptual diagram illustrating three neighbor CTUs in other sub-pictures.

FIG. 13 is a conceptual diagram illustrating three neighbor CTUs in other sub-pictures. FIG. 13 depicts BIF/HTDF template 502 for current to-be-filtered pixel 500. Alternatively, if the neighbor 3 CTUs of current to-be-filtered pixel are in other sub-pictures as shown in FIG. 13, the techniques described above with respect to Example 3 (for a current to-be-filtered pixel that requires a pixel beyond a picture boundary) may be applied by filter unit 216 of video encoder 200 and filter unit 312 of video decoder 300. For example, filter unit 216 of video encoder 200 and filter unit 312 of video decoder 300, for example, may apply padding to the filter template. Video encoder 200 or video decoder 300 may code the current to-be-filtered pixel based on the padded filter template. Alternatively, filter unit 216 of video encoder 200 and filter unit 312 of video decoder 300 may apply partial filter templates and renormalize the filter output depending on the number of available neighbor pixels. Video encoder 200 or video decoder 300 may code the current to-be-filtered pixel based on the renormalized filter output.

In other examples, if only 1 neighbor CTU of a current to-be-filtered pixel is in another sub-picture, as shown in FIG. 12 as an example, only one pixel in the template is unavailable (the vertically striped circle in FIG. 12). The unavailable pixel has two neighbor CTUs that are in the same sub-picture as the current to-be-filtered pixel. Filter unit 216 of video encoder 200 and filter unit 312 of video decoder 300, for example, may generate the unavailable pixel by using closed padding or mirrored padding from one of the two neighbor CTUs that are in the same sub-picture as the current to-be-filtered pixel.

Alternatively, the unavailable pixel may not be used, and the filter results may be renormalized by filter unit 216 of video encoder 200 and filter unit 312 of video decoder 300, for example.

Figure 14:
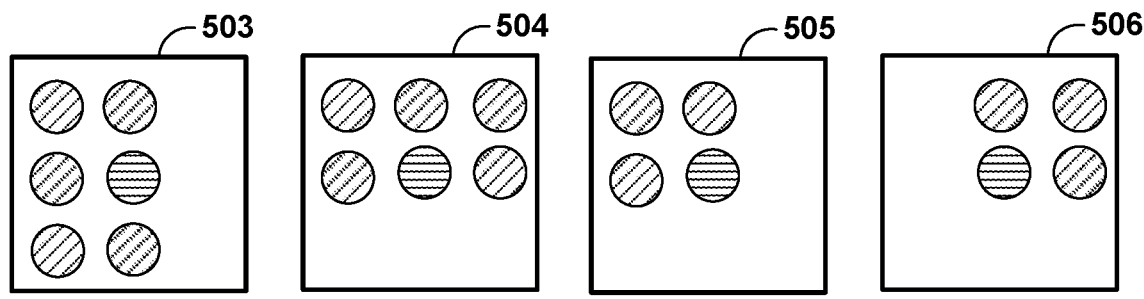
FIG. 14 is a conceptual diagram illustrating partial filter template examples of FIG. 12.

FIG. 14 is a conceptual diagram illustrating partial filter template examples of FIG. 12. Partial filter templates 503, 504, 505 and 506 are shown. Alternatively, a partial filter template may be used (as shown in the examples of FIG. 14), and the filter results may be renormalized by filter unit 216 of video encoder 200 and filter unit 312 of video decoder 300, for example.

Figure 15:
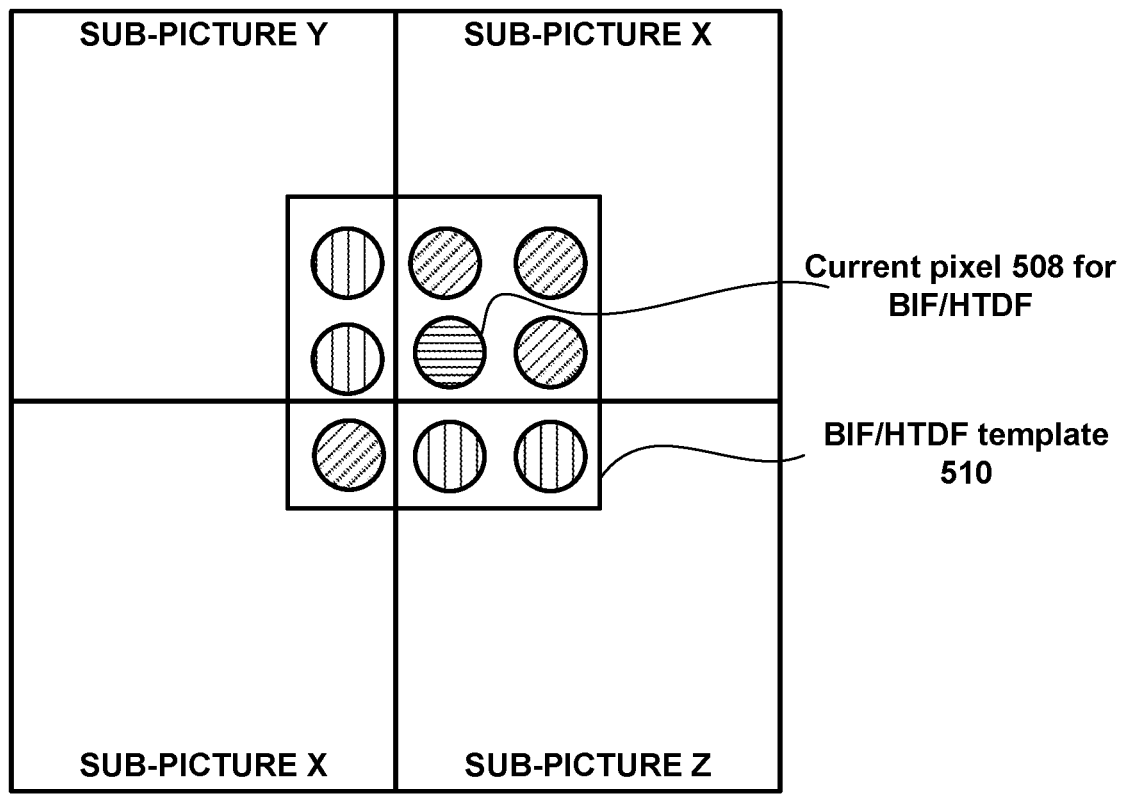
FIG. 15 is a conceptual diagram illustrating only one non-adjacent CTU in the same sub-picture as a current to-be-filtered pixel.

Example 6. FIG. 15 is a conceptual diagram illustrating only one non-adjacent CTU in the same sub-picture as a current to-be-filtered pixel. In the example of FIG. 15, current to-be-filtered pixel 508 is shown in sub-picture X and in BIF/HTDF template 510. As can be seen, only one non-adjacent CTU is in the same sub-picture as current to-be-filtered pixel 508. When loop filter across sub-pictures is disabled, if a current to-be-filtered pixel is located at the corner of a CTU, where only one of three neighbor CTUs is in the same sub-picture as the current to-be-filtered pixel, but this neighbor CTU is not adjacent to a current CTU, see FIG. 15 as an example, filter unit 216 of video encoder 200 and filter unit 312 of video decoder 300, for example, may not apply BIF and HTDF to the current to-be-filtered pixel. For example, video encoder 200 or video decoder 300 may determine whether loop filter across sub-pictures is disabled. Video encoder 200 or video decoder 300 may also determine whether a current to-be-filtered pixel is located at a corner of a CTU. Video encoder 200 or video decoder 300 may also determine whether only one of three neighbor CTUs is in a same sub-picture as the current to-be-filtered pixel and that the one of three neighbor CTUs is not adjacent to the current CTU. Based on loop filter across sub-pictures being disabled, the current to-be-filtered pixel being located at the corner of the CTU, and only one of three neighbor CTUs being in the same sub-picture as the current to-be-filtered pixel and one of the three neighbor CTUs not being adjacent to the current CTU, video encoder 200 or video decoder 300 may code the current to-be-filtered pixel without applying BIF or HTDF.

Alternatively, filter unit 216 of video encoder 200 and filter unit 312 of video decoder 300, for example, may replace each unavailable pixel by the closest available pixel in the template. For example, filter unit 216 of video encoder 200 or filter unit 312 of video decoder 300 may apply padding to the filter template. Video encoder 200 or video decoder 300 may code the current to-be-filtered pixel based on the padded filter template.

Alternatively, filter unit 216 of video encoder 200 and filter unit 312 of video decoder 300, for example, may replace each unavailable pixel with a pixel by using closest padding or mirrored padding from a CTU (for example, a current CTU).

Alternatively, filter unit 216 of video encoder 200 and filter unit 312 of video decoder 300, for example, may replace each unavailable pixel with a pixel by using closest padding or mirrored padding from available pixels in horizontal (or vertical) direction. If pixels are still unavailable, closest padding or mirrored padding may be applied from available pixels in vertical (or horizontal) direction.

Alternatively, filter unit 216 of video encoder 200 and filter unit 312 of video decoder 300, for example, may replace unavailable pixels by a weighted sum of available pixels.

Alternatively, filter unit 216 of video encoder 200 and filter unit 312 of video decoder 300, for example, may use a partial filter template and renormalize the filtering results. For example, only pixels from a current CTU may be applied for filtering.

In accordance with one or more techniques of this disclosure, the line buffer for BIF may be removed.

For example, when a pixel requires unavailable pixels that are beyond the virtual boundary (e.g., pixels corresponding to gray-shaded circles in FIG. 8), a video coder (e.g., video encoder 200 or video decoder 300) may not apply BIF/HTDF to the current to-be-filtered pixel. Flags at a sequence, picture, slice, tile, tile group, brick, and/or CTU level may be signaled to indicate whether BIF/HTDF is applied for this case.

In some examples, a video coder (e.g., video encoder 200 or video decoder 300) may still apply BIF/HTDF to a current to-be-filtered pixel that requires unavailable pixels. In this example, an unavailable pixel (e.g., a pixel corresponding to a gray-shaded circle) may be replaced by the closest available pixel, as shown in the example of FIG. 9. For instance, in the example of FIG. 9, the video coder may use values of pixels in the row containing the current to-be-filtered pixel as values of pixels in the row above the current to-be-filtered pixel.

In some examples, a video coder (e.g., video encoder 200 or video decoder 300) may still apply BIF/HTDF to a current to-be-filtered pixel that requires unavailable pixels. In this example, the video coder may replace an unavailable pixel (e.g., a pixel corresponding to a gray-shaded circle in FIG. 8) by a vertical mirrored pixel as shown in FIG. 10.

In some examples, a video coder (e.g., video encoder 200 or video decoder 300) may still apply BIF/HTDF to a current to-be-filtered pixel that requires unavailable pixels. However, the video coder does not use the unavailable pixels (e.g., pixels corresponding to gray-shaded circles) as shown in FIG. 11A. Rather, only those available pixels may contribute to (Eqn 8) (those $m_i$ with unavailable pixels will be set as 0). The video coder (e.g., video encoder 200 or video decoder 300) may then scale $cm_{sum}$ in (Eqn 9) based on how many neighboring pixels are available. For example, $cm_{sum}$ can be re-scaled as:

$$cm_{sum} = cm_{sum} * 8 / num_{available\_neighb\_pixels}$$

For HTDF, due to the reduction of Hadamard transform by half, normalization may be performed by right shifting on 1 bit instead of 2 bits.

In some examples, a video coder (e.g., video encoder 200 or video decoder 300) may still apply BIF to a current to-be-filtered pixel that requires unavailable pixels. However, the unavailable pixels (e.g., pixels corresponding to gray-shaded circles in FIG. 8) are not used as shown in FIG. 11A. In some examples, only four available pixels (examples are shown in FIG. 11B) may contribute to (Eqn 8) (the values of unused $m_i$ may be set as 0). The video coder may then rescale $I_F$ in (Eqn 10) as $$I_F = I_C + ((cm_{sum} + 2) >> 2) \quad \text{(Eqn 10')}$$

Instead of averaging, the weighted sum may be applied to outputs of BIF, HTDF and SAO. The weights may be signaled at a sequence, picture, slice, tile, tile group, brick, and/or CTU level. Alternately, the video coder may apply fixed weights.

Figure 16:
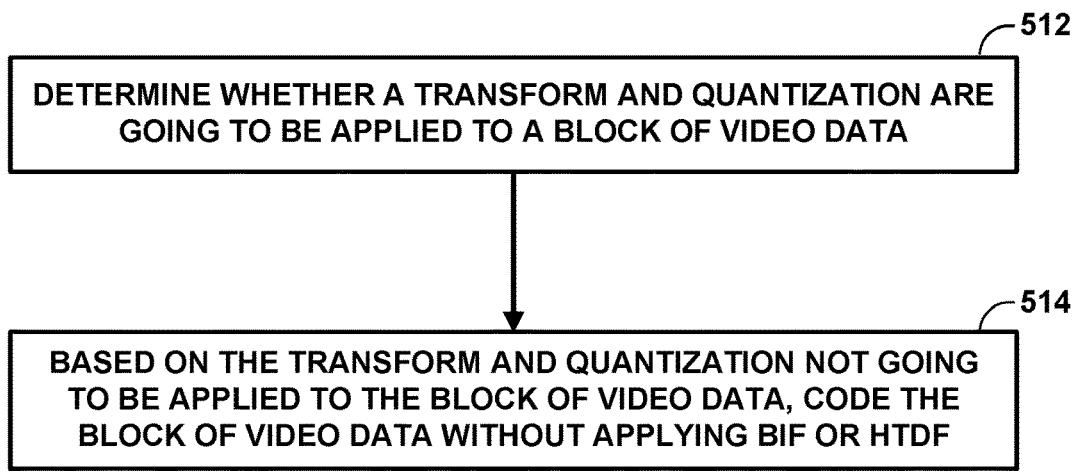
FIGS. 16-31 are flowcharts illustrating examples of picture and sub-picture boundary processing according to the techniques of this disclosure.

FIG. 16 is a flowchart illustrating an example of picture and sub-picture boundary processing according to the techniques of this disclosure. One or more processors of video encoder 200 or video decoder 300 may determine whether a transform and quantization are applied to a block of video data (512). For example, video encoder 200 or video decoder 300 may determine whether a cu_transquant_bypass_flag is true. Based on the transform and quantization not being applied to the block of video data, video encoder 200 or video decoder 300 may code the block of video data without applying BIF or HTDF (514). For example, filter unit 216 of video encoder 200 or filter unit 312 of video decoder 300 may not apply BIF or HTDF to the block of video data.

Figure 17:
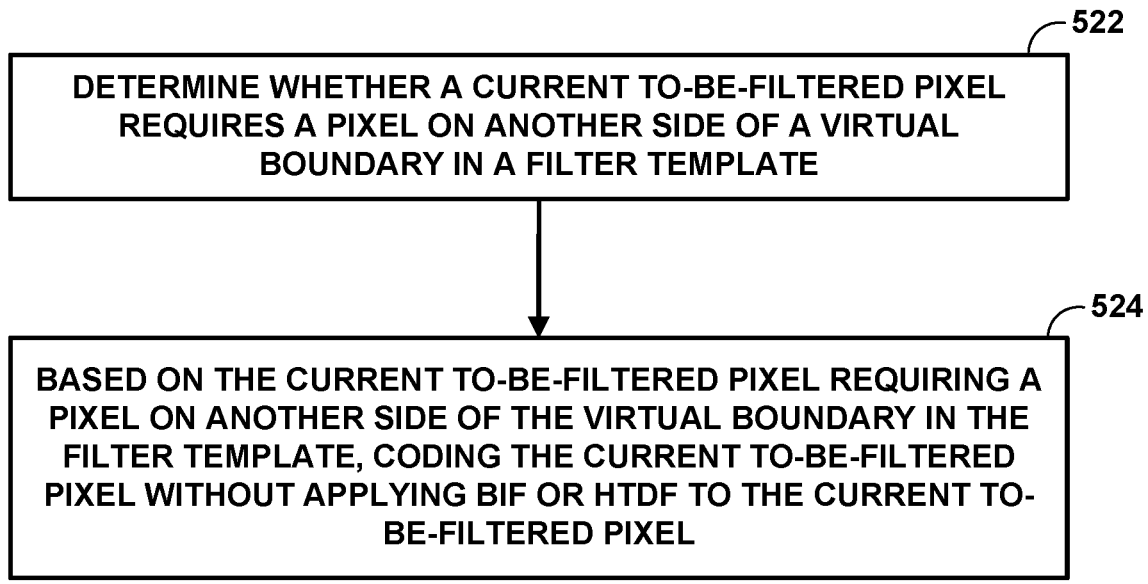

FIG. 17 is another flowchart illustrating an example of picture and sub-picture boundary processing according to the techniques of this disclosure. The techniques of FIG. 17 may be used in combination with other techniques of this disclosure or on their own. Video encoder 200 or video decoder 300 may determine whether a PPS flag is 1 (520). For example, Filter unit 216 of video encoder 200 or filter unit 312 of video decoder 300 may determine whether a current to-be-filtered pixel requires a pixel on another side of a virtual boundary in a filter template (522). For example, filter unit 216 of video encoder 200 or filter unit 312 of video decoder 300 may determine that a pixel that is needed for a pixel template is located on another side of a virtual boundary. Based on the current to-be-filtered pixel requiring a pixel on another side of the virtual boundary in the filter template, the video coder codes the current to-be-filtered pixel without applying BIF or HTDF to the current to-be-filtered pixel (524). For example, filter unit 216 of video encoder 200 or filter unit 312 of video decoder 300 may not apply BIF or HTDF to the current to-be-filtered pixel in this case.

Figure 18:
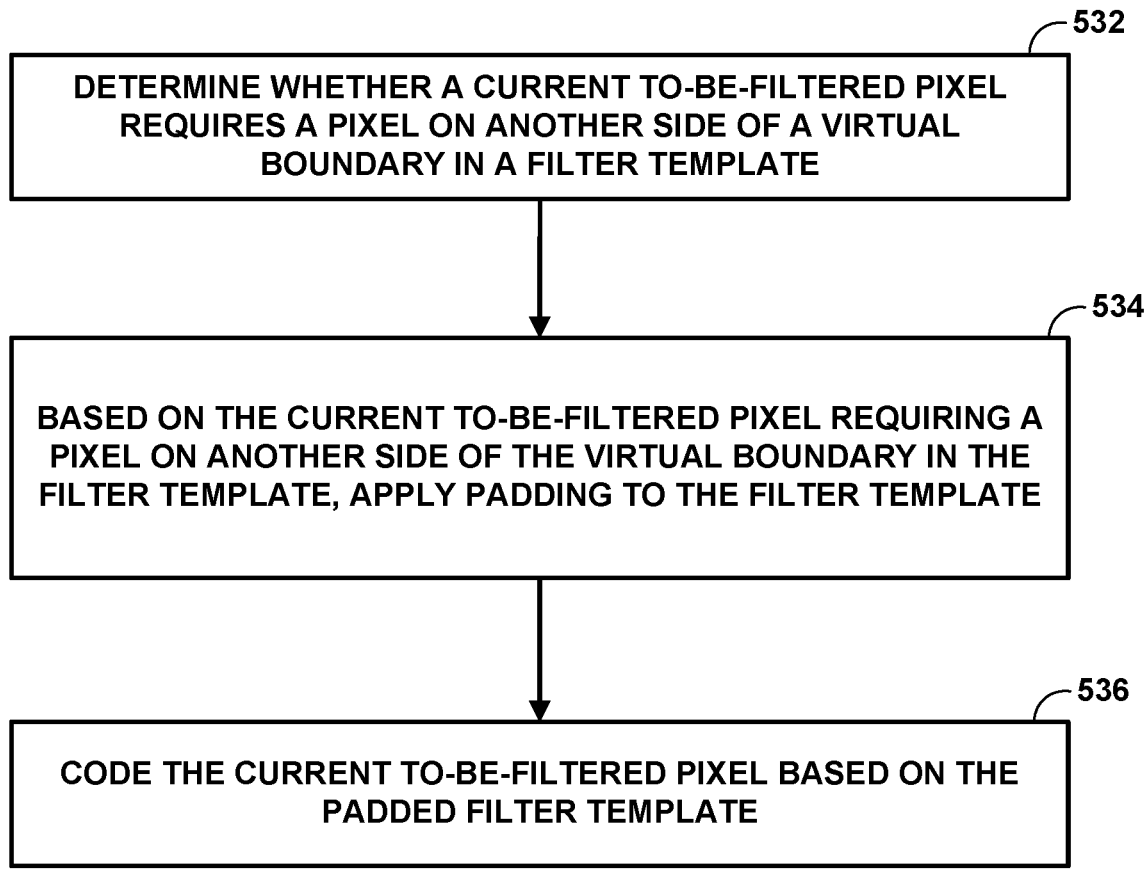

FIG. 18 is another flowchart illustrating an example of picture and sub-picture boundary processing according to the techniques of this disclosure. The techniques of FIG. 18 may be used in combination with other techniques of this disclosure or on their own. Filter unit 216 of video encoder 200 or filter unit 312 of video decoder 300 determine whether a current to-be-filtered pixel requires a pixel on another side of a virtual boundary in a filter template (532). For example, filter unit 216 of video encoder 200 or filter unit 312 of video decoder 300 may determine that a pixel that is needed for a pixel template is located on another side of a virtual boundary. Based on the current to-be-filtered pixel requiring a pixel on another side of the virtual boundary in the filter template, filter unit 216 of video encoder 200 or filter unit 312 of video decoder 300 may apply padding to the filter template (534). For example, filter unit 216 of video encoder 200 or filter unit 312 of video decoder 300 may apply closest padding or mirrored padding to substitute for the pixel on the other side of the virtual boundary. Video encoder 200 or video decoder 300 may code the current-to-be-filtered pixel based on the padded filter template (536).

Figure 19:
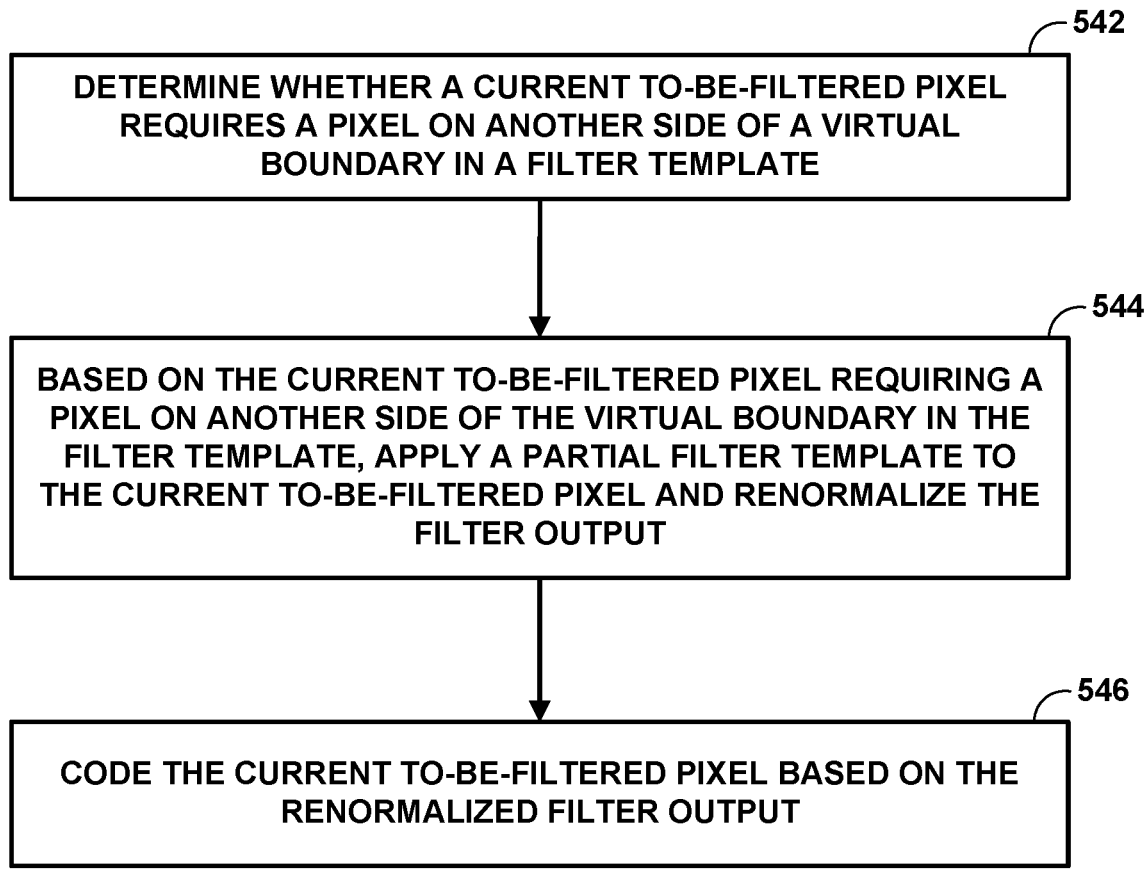

FIG. 19 is another flowchart illustrating an example of picture and sub-picture boundary processing according to the techniques of this disclosure. The techniques of FIG. 19 may be used in combination with other techniques of this disclosure or on their own. Filter unit 216 of video encoder 200 or filter unit 312 of video decoder 300 may determine whether a PPS flag is 1 (540). For example, filter unit 216 of video encoder 200 or filter unit 312 of video decoder 300 may determine whether a current to-be-filtered pixel requires a pixel on another side of a virtual boundary in a filter template (542). For example, filter unit 216 of video encoder 200 or filter unit 312 of video decoder 300 may determine that a pixel that is needed for a pixel template is located on another side of a virtual boundary. Based on the current to-be-filtered pixel requiring a pixel on another side of the virtual boundary in the filter template, filter unit 216 of video encoder 200 or filter unit 312 of video decoder 300 apply a partial filter template to the current to-be-filtered pixel and renormalize the filter output (544). For example, filter unit 216 of video encoder 200 or filter unit 312 of video decoder 300 may only use available pixels in the template and apply a renormalizing formula, as disclosed herein, to the filter output. Video encoder 200 or video decoder 300 may code the current to-be-filtered pixel based on the renormalized filter output (546).

Figure 20:
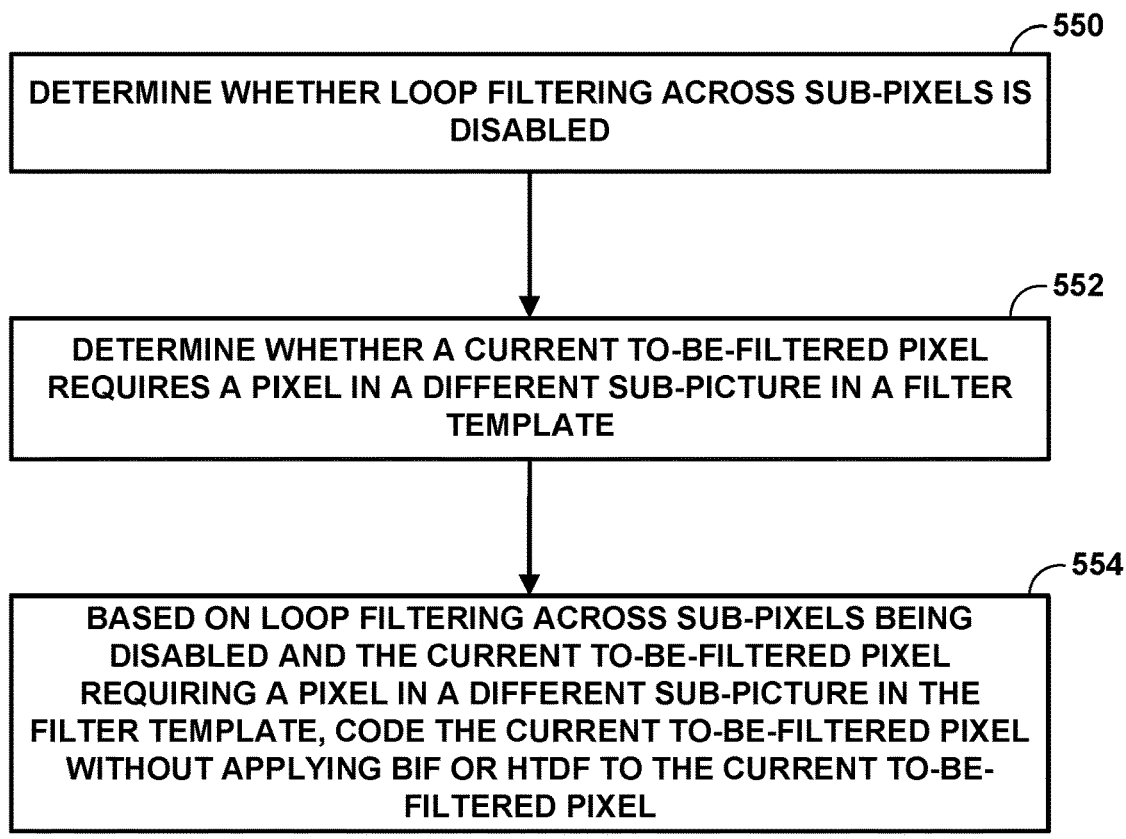

FIG. 20 is another flowchart illustrating an example of picture and sub-picture boundary processing according to the techniques of this disclosure. The techniques of FIG. 20 may be used in combination with other techniques of this disclosure or on their own. Video encoder 200 or video decoder 300 may determine whether loop filtering across sub-pictures is disabled (550). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel requires a pixel in a different sub-picture in a filter template (552). For example, filter unit 216 of video encoder 200 or filter unit 312 of video decoder 300 may determine a filter template requires pixels in more than one sub-picture. Based on loop filtering across sub-pictures being disabled and the current to-be filtered pixel requiring a pixel in a different sub-picture, video encoder 200 and video decoder 300 may code the current to-be-filtered pixel without applying BIF or HTDF (554).

Figure 21:
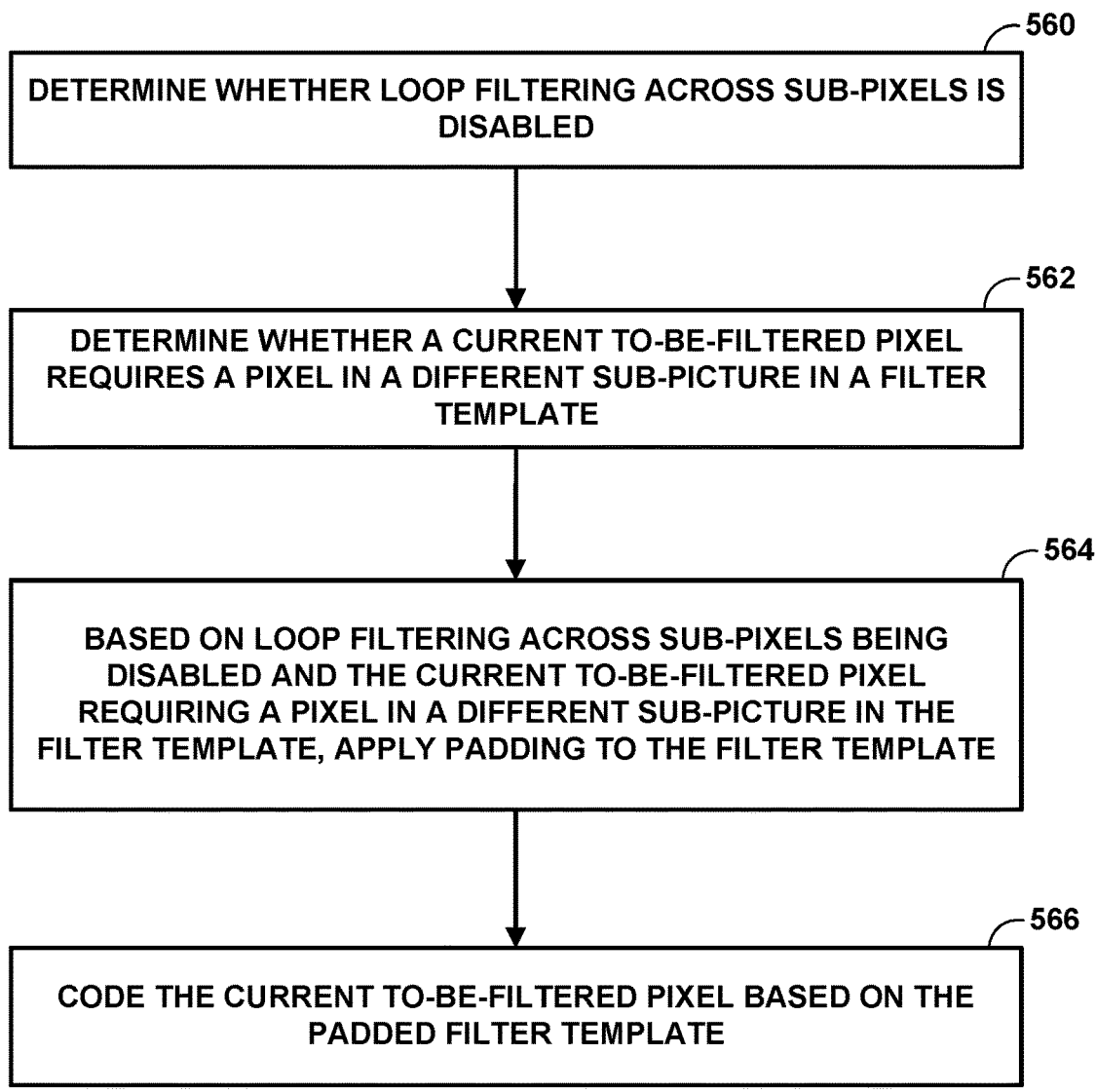

FIG. 21 is another flowchart illustrating an example of picture and sub-picture boundary processing according to the techniques of this disclosure. The techniques of FIG. 21 may be used in combination with other techniques of this disclosure or on their own. Video encoder 200 or video decoder 300 may determine whether loop filtering across sub-pictures is disabled (560). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel requires a pixel in a different sub-picture in a filter template (562). For example, filter unit 216 of video encoder 200 or filter unit 312 of video decoder 300 may determine a filter template requires pixels in more than one sub-picture. Based on loop filtering across sub-pictures being disabled and the current to-be filtered pixel requiring a pixel in a different sub-picture, filter unit 216 of video encoder 200 or filter unit 312 of video decoder 300 may apply padding to the filter template (564). For example, filter unit 216 of video encoder 200 or filter unit 312 of video decoder 300 may apply closest padding or mirrored padding to substitute for the pixel in a different sub-picture than the current to-be-filtered pixel. Video encoder 200 or video decoder 300 may code the current-to-be-filtered pixel based on the padded filter template (566).

Figure 22:
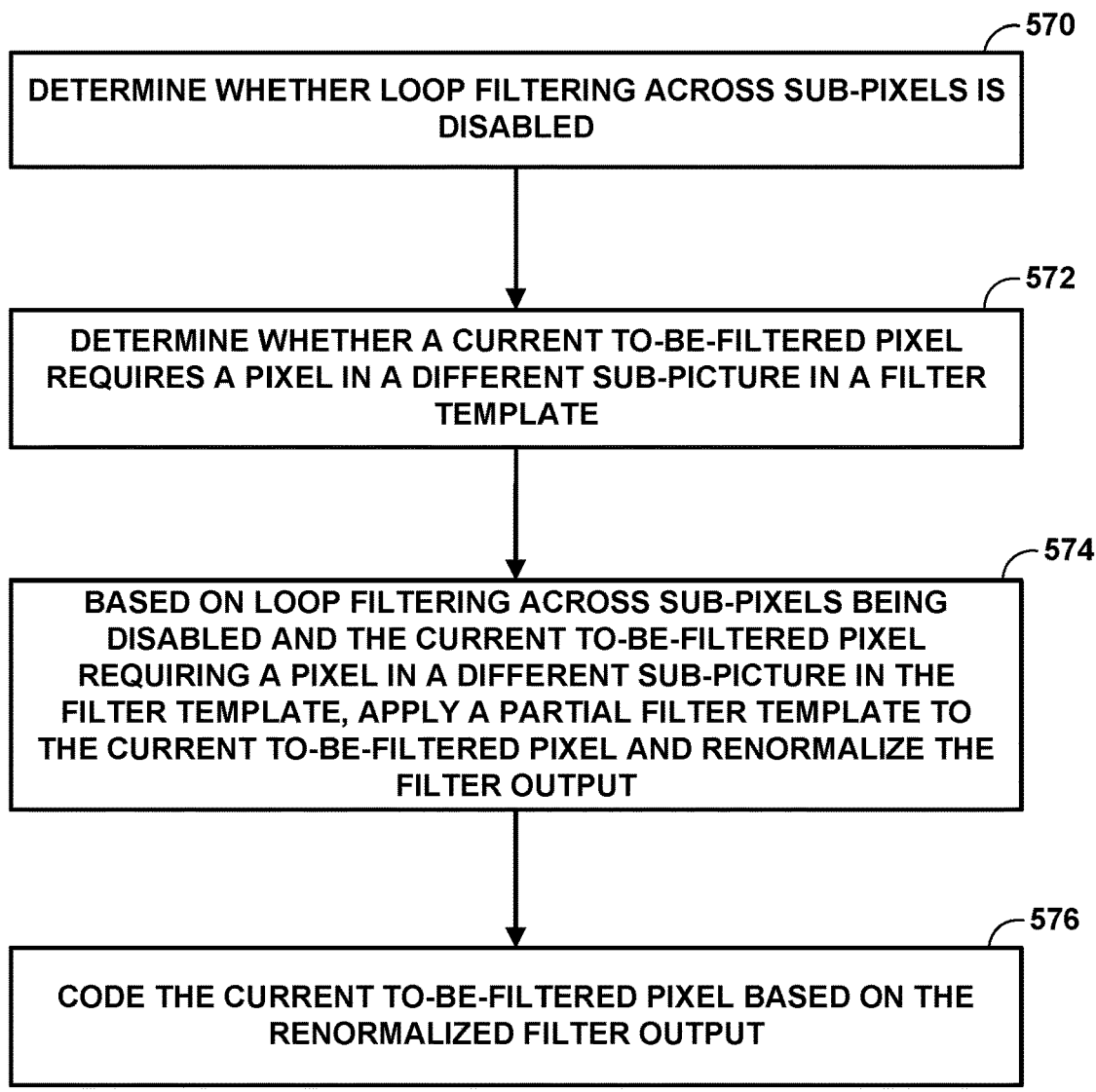

FIG. 22 is another flowchart illustrating an example of picture and sub-picture boundary processing according to the techniques of this disclosure. The techniques of FIG. 22 may be used in combination with other techniques of this disclosure or on their own. Video encoder 200 or video decoder 300 may determine whether loop filtering across sub-pictures is disabled (570). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel requires a pixel in a different sub-picture in a filter template (572). For example, filter unit 216 of video encoder 200 or filter unit 312 of video decoder 300 may determine a filter template requires pixels in more than one sub-picture. Based on loop filtering across sub-pictures being disabled and the current to-be filtered pixel requiring a pixel in a different sub-picture, filter unit 216 of video encoder 200 or filter unit 312 of video decoder 300 may apply a partial filter template to the current-to-be-filtered pixel and renormalize the filter output (574). For example, filter unit 216 of video encoder 200 or filter unit 312 of video decoder 300 may only use available pixels in the template and apply a renormalizing formula, as disclosed herein, to the filter output. Video encoder 200 or video decoder 300 may code the current to-be-filtered pixel based on the renormalized filter output (576).

Figure 23:
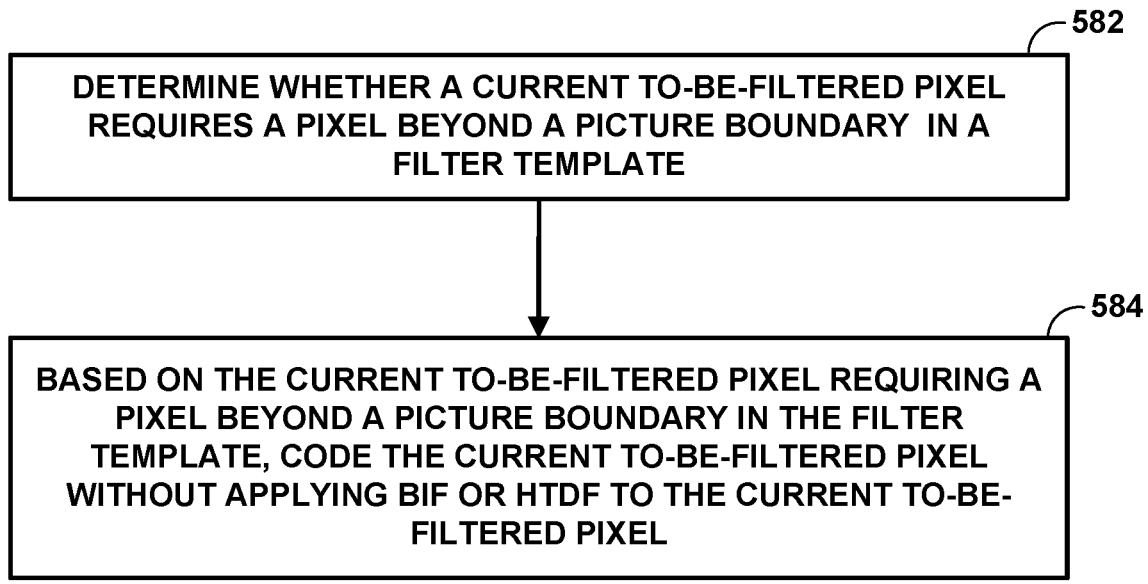

FIG. 23 is another flowchart illustrating an example of picture and sub-picture boundary processing according to the techniques of this disclosure. The techniques of FIG. 23 may be used in combination with other techniques of this disclosure or on their own. Filter unit 216 of video encoder 200 or filter unit 312 of video decoder 300 may determine whether a current to-be-filtered pixel requires a pixel beyond a picture boundary in a filter template (582). For example, filter unit 216 of video encoder 200 or filter unit 312 of video decoder 300 may determine a filter template requires pixels in more than one picture. Based on the current to-be filtered pixel requiring a pixel beyond a picture boundary in the filter template, video encoder 200 and video decoder 300 may code the current to-be-filtered pixel without applying BIF or HTDF (584).

Figure 24:
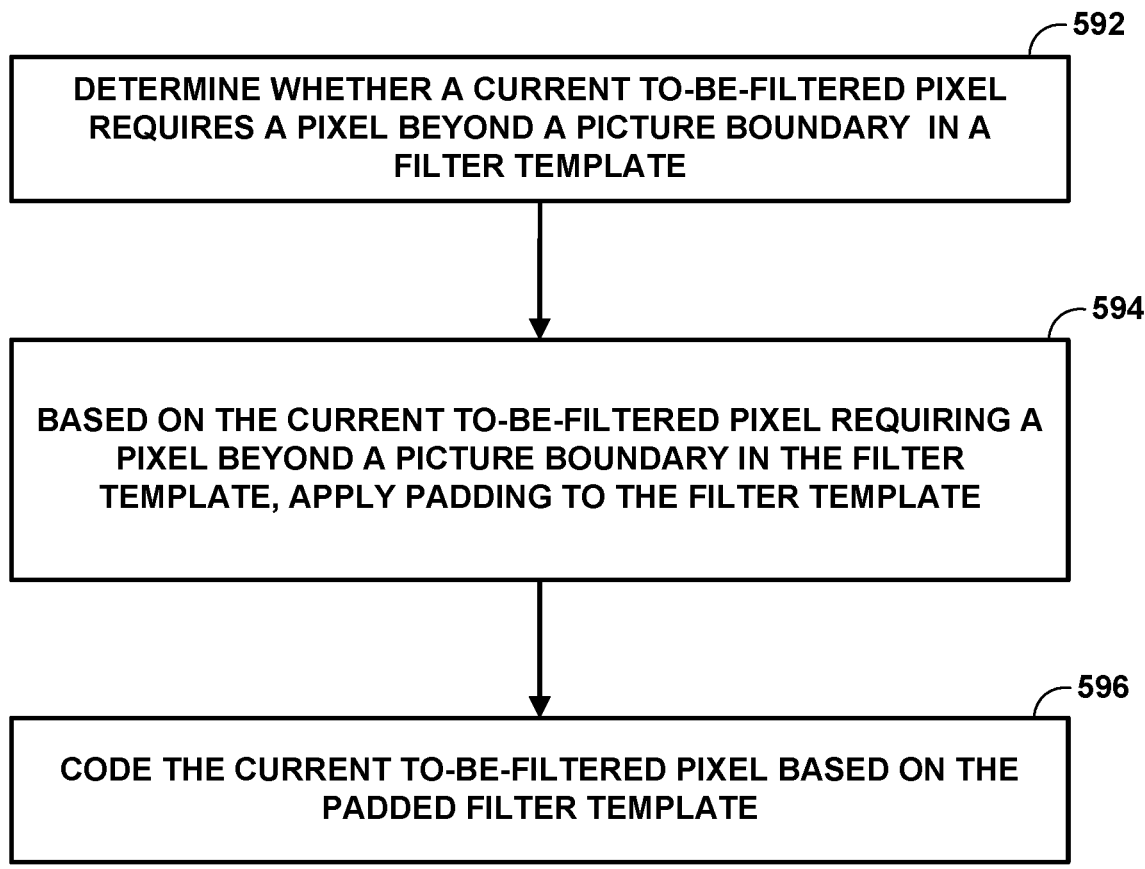

FIG. 24 is another flowchart illustrating an example of picture and sub-picture boundary processing according to the techniques of this disclosure. The techniques of FIG. 24 may be used in combination with other techniques of this disclosure or on their own. Filter unit 216 of video encoder 200 or filter unit 312 of video decoder 300 may determine whether a current to-be-filtered pixel requires a pixel beyond a picture boundary in a filter template (592). For example, filter unit 216 of video encoder 200 or filter unit 312 of video decoder 300 may determine a filter template requires pixels in more than one picture. Based on the current to-be-filtered pixel requiring a pixel beyond a picture boundary in the filter template, video encoder 200 and video decoder 300 may apply padding to the filter template (594). For example, filter unit 216 of video encoder 200 or filter unit 312 of video decoder 300 may apply closest padding or mirrored padding to substitute for the pixel beyond the picture boundary. Video encoder 200 or video decoder 300 may code the current-to-be-filtered pixel based on the padded filter template (596).

Figure 25:
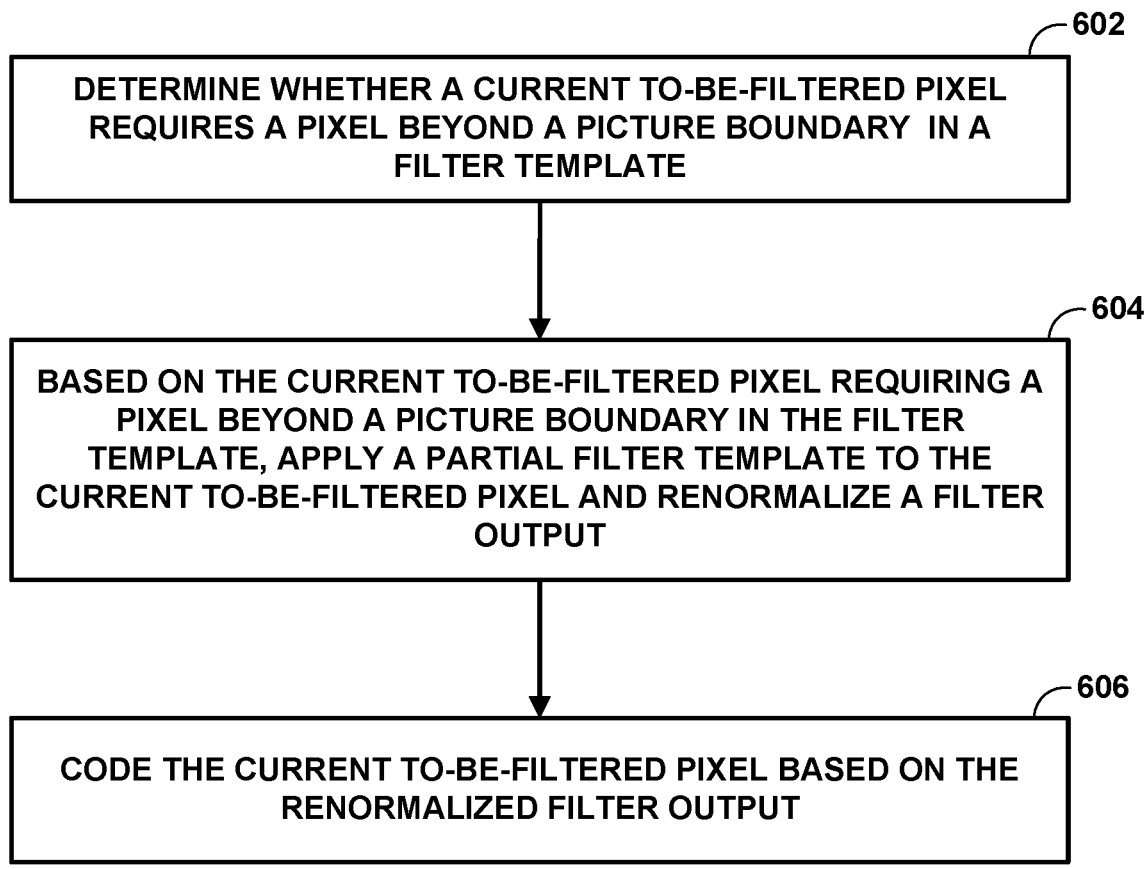

FIG. 25 is another flowchart illustrating an example of picture and sub-picture boundary processing according to the techniques of this disclosure. The techniques of FIG. 25 may be used in combination with other techniques of this disclosure or on their own. Filter unit 216 of video encoder 200 or filter unit 312 of video decoder 300 may determine whether a current to-be-filtered pixel requires a pixel beyond a picture boundary in a filter template (602). For example, filter unit 216 of video encoder 200 or filter unit 312 of video decoder 300 may determine a filter template requires pixels in more than one picture. Based on the current to-be filtered pixel requiring a pixel beyond a picture boundary in the filter template, video encoder 200 and video decoder 300 may apply a partial filter template to the current to-be-filtered pixel and renormalize the filter output (604). For example, filter unit 216 of video encoder 200 or filter unit 312 of video decoder 300 may only use available pixels in the template and apply a renormalizing formula, as disclosed herein, to the filter output. Video encoder 200 or video decoder 300 may code the current-to-be-filtered pixel based on the renormalized filter output (606).

Figure 26:
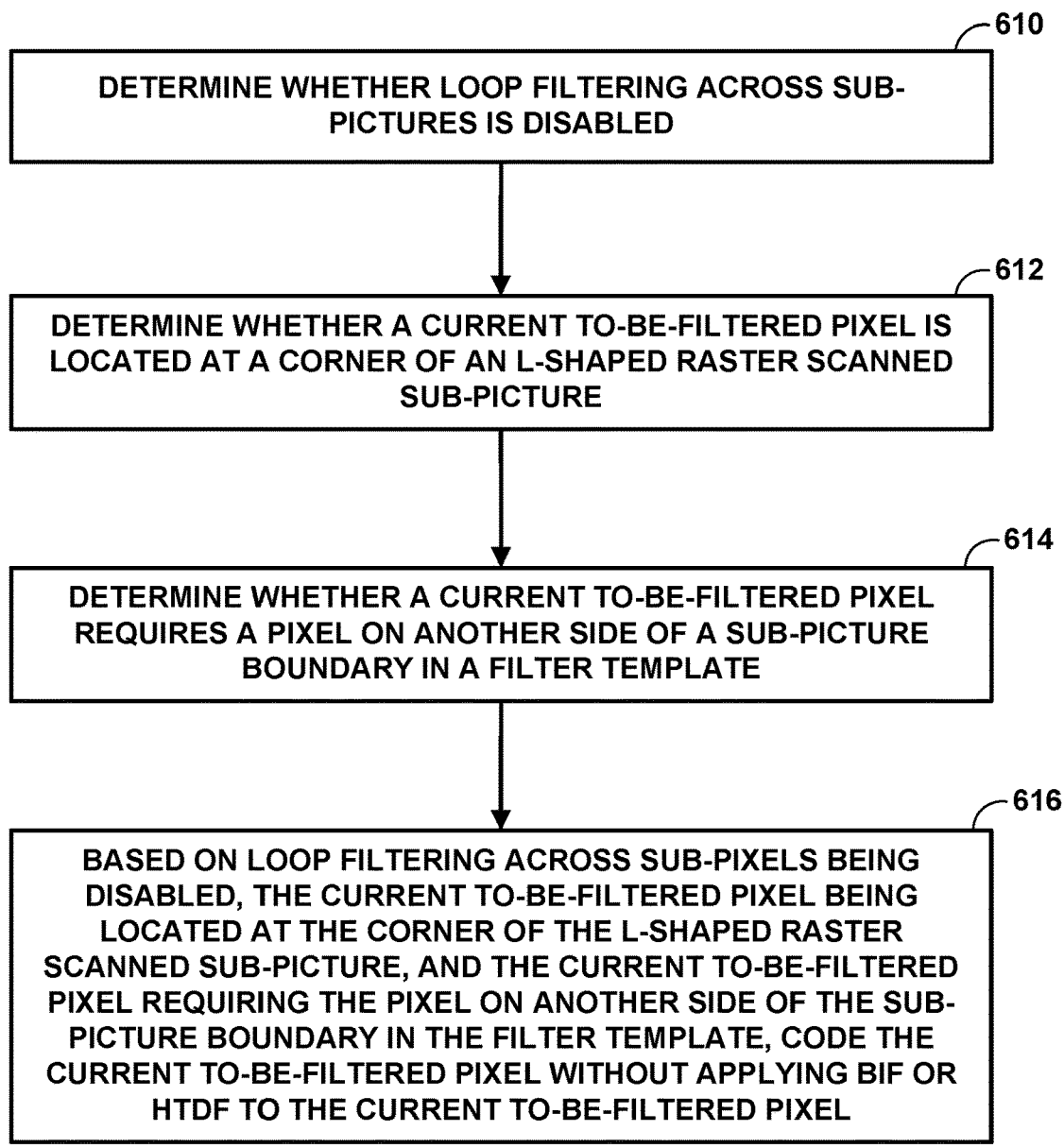

FIG. 26 is another flowchart illustrating an example of picture and sub-picture boundary processing according to the techniques of this disclosure. The techniques of FIG. 26 may be used in combination with other techniques of this disclosure or on their own. Video encoder 200 or video decoder 300 may determine whether loop filtering across sub-pictures is disabled (610). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel is located at a corner of an L-shaped raster scanned sub-picture (612). For example, filter unit 216 of video encoder 200 or filter unit 312 of video decoder 300 may determine whether a current to-be-filtered pixel is located as depicted in FIG. 12. Filter unit 216 of video encoder 200 or filter unit 312 of video decoder 300 may determine whether a current to-be-filtered pixel requires a pixel in a different sub-picture in a filter template (614). For example, filter unit 216 of video encoder 200 or filter unit 312 of video decoder 300 may determine a filter template requires pixels in more than one sub-picture. Based on loop filtering across sub-pictures being disabled, a current to-be-filtered pixel being located at the corner of the L-shaped raster scanned sub-picture, and the current to-be filtered pixel requiring a pixel in a different sub-picture, video encoder 200 and video decoder 300 may code the current to-be-filtered pixel without applying BIF or HTDF (616).

Figure 27:
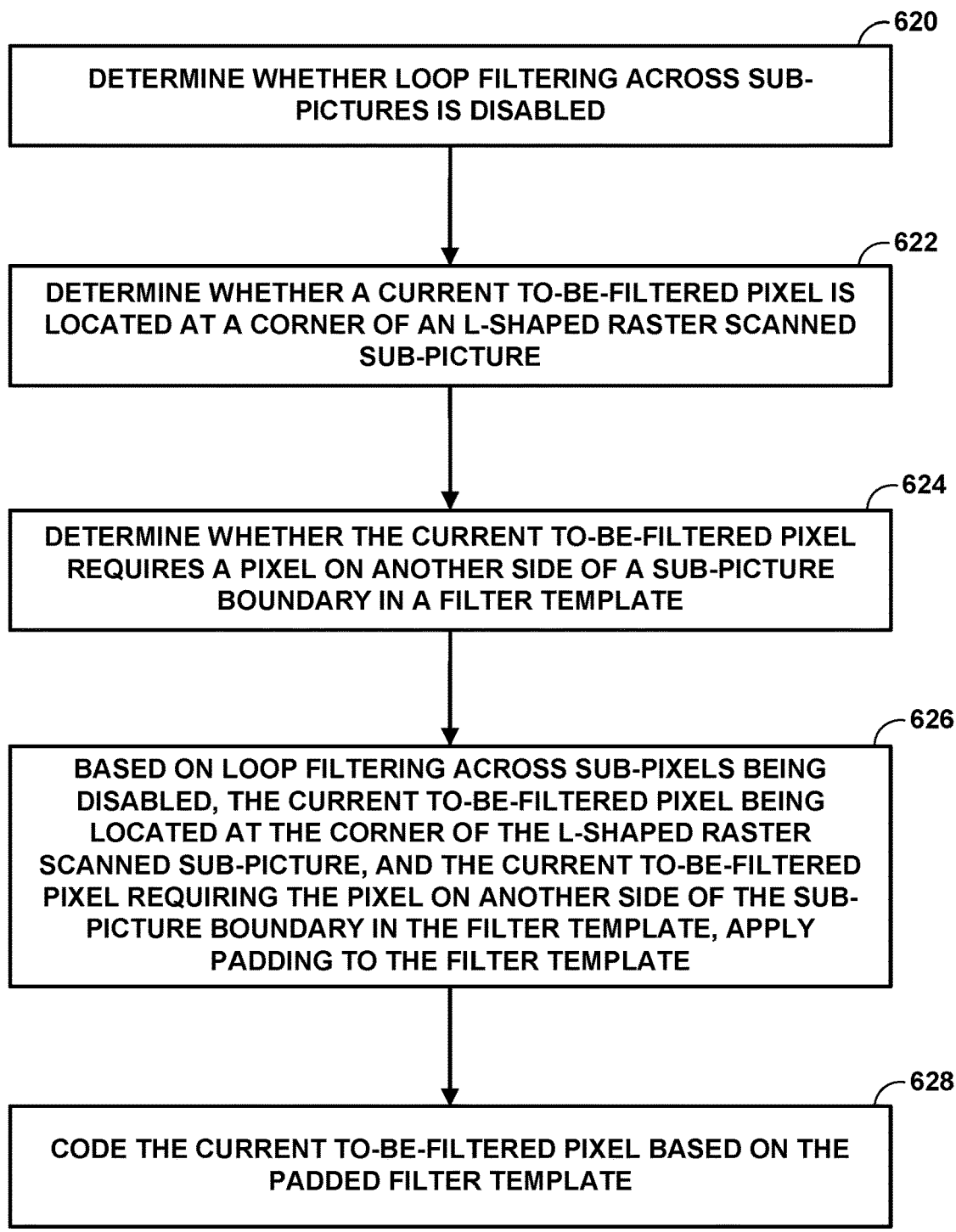

FIG. 27 is another flowchart illustrating an example of picture and sub-picture boundary processing according to the techniques of this disclosure. The techniques of FIG. 27 may be used in combination with other techniques of this disclosure or on their own. Video encoder 200 or video decoder 300 may determine whether loop filtering across sub-pictures is disabled (620). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel is located at a corner of an L-shaped raster scanned sub-picture (622). For example, filter unit 216 of video encoder 200 or filter unit 312 of video decoder 300 may determine whether a current to-be-filtered pixel is located as depicted in FIG. 12. Filter unit 216 of video encoder 200 or filter unit 312 of video decoder 300 may determine whether a current to-be-filtered pixel requires a pixel in a different sub-picture in a filter template (624). For example, filter unit 216 of video encoder 200 or filter unit 312 of video decoder 300 may determine a filter template requires pixels in more than one sub-picture. Based on loop filtering across sub-pictures being disabled, a current to-be-filtered pixel being located at the corner of the L-shaped raster scanned sub-picture, and the current to-be filtered pixel requiring a pixel in a different sub-picture, video encoder 200 and video decoder 300 may apply padding to the filter template (626). For example, filter unit 216 of video encoder 200 or filter unit 312 of video decoder 300 may apply closest padding or mirrored padding to substitute for the pixel beyond the picture boundary. Video encoder 200 or video decoder 300 may code the current-to-be-filtered pixel based on the padded filter template (628).

Figure 28:
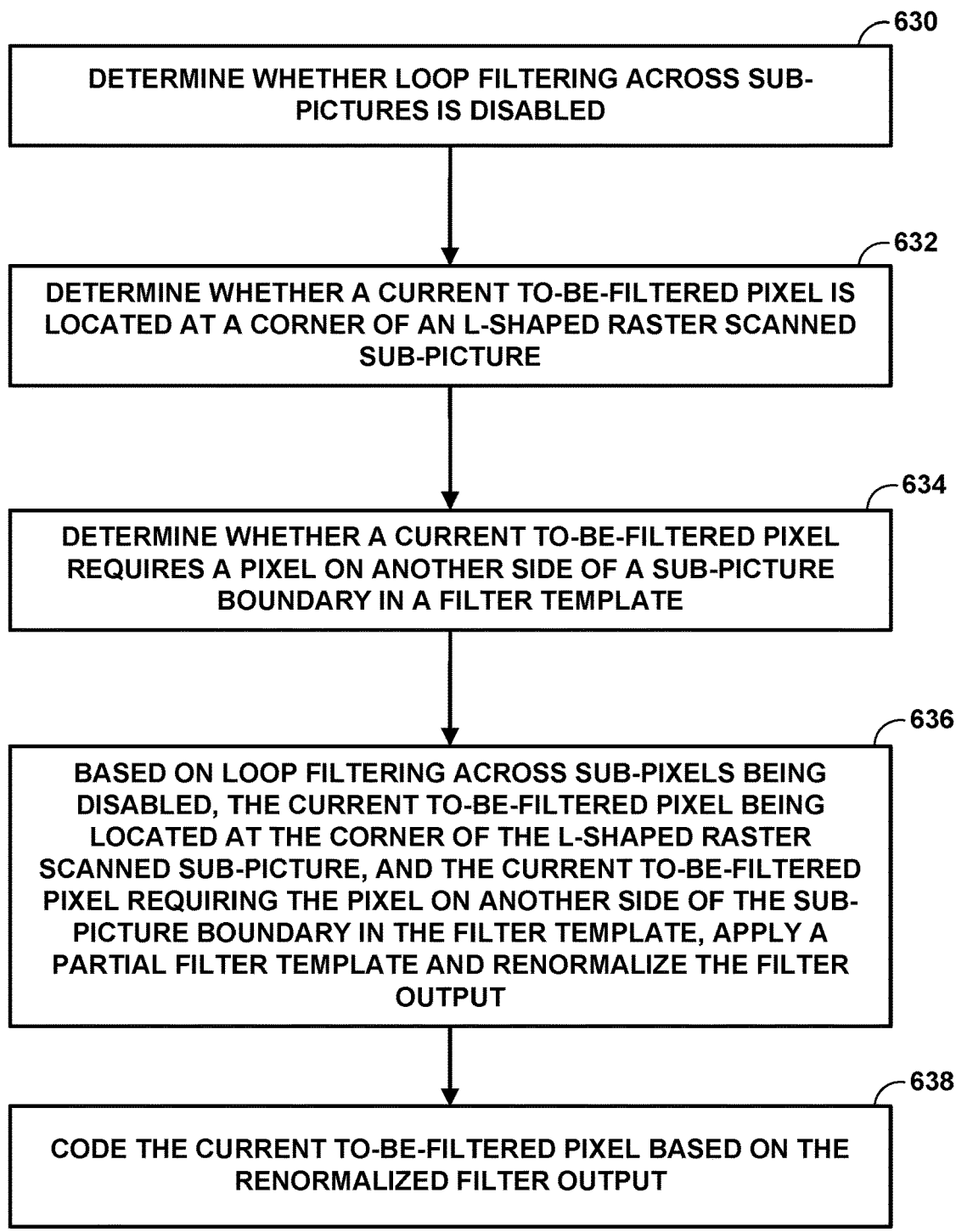

FIG. 28 is another flowchart illustrating an example of picture and sub-picture boundary processing according to the techniques of this disclosure. The techniques of FIG. 28 may be used in combination with other techniques of this disclosure or on their own. Video encoder 200 or video decoder 300 may determine whether loop filtering across sub-pictures is disabled (630). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel is located at a corner of an L-shaped raster scanned sub-picture (632). For example, filter unit 216 of video encoder 200 or filter unit 312 of video decoder 300 may determine whether a current to-be-filtered pixel is located as depicted in FIG. 12. Filter unit 216 of video encoder 200 or filter unit 312 of video decoder 300 may determine whether a current to-be-filtered pixel requires a pixel in a different sub-picture in a filter template (634). For example, filter unit 216 of video encoder 200 or filter unit 312 of video decoder 300 may determine a filter template requires pixels in more than one sub-picture. Based on loop filtering across sub-pictures being disabled, a current to-be-filtered pixel being located at the corner of the L-shaped raster scanned sub-picture, and the current to-be filtered pixel requiring a pixel in a different sub-picture, video encoder 200 and video decoder 300 may apply a partial filter template to the current to-be-filtered pixel and renormalize the filter output (636). For example, filter unit 216 of video encoder 200 or filter unit 312 of video decoder 300 may only use available pixels in the template and apply a renormalizing formula, as disclosed herein, to the filter output. Video encoder 200 or video decoder 300 may code the current-to-be-filtered pixel based on the renormalized filter output (638).

Figure 29:
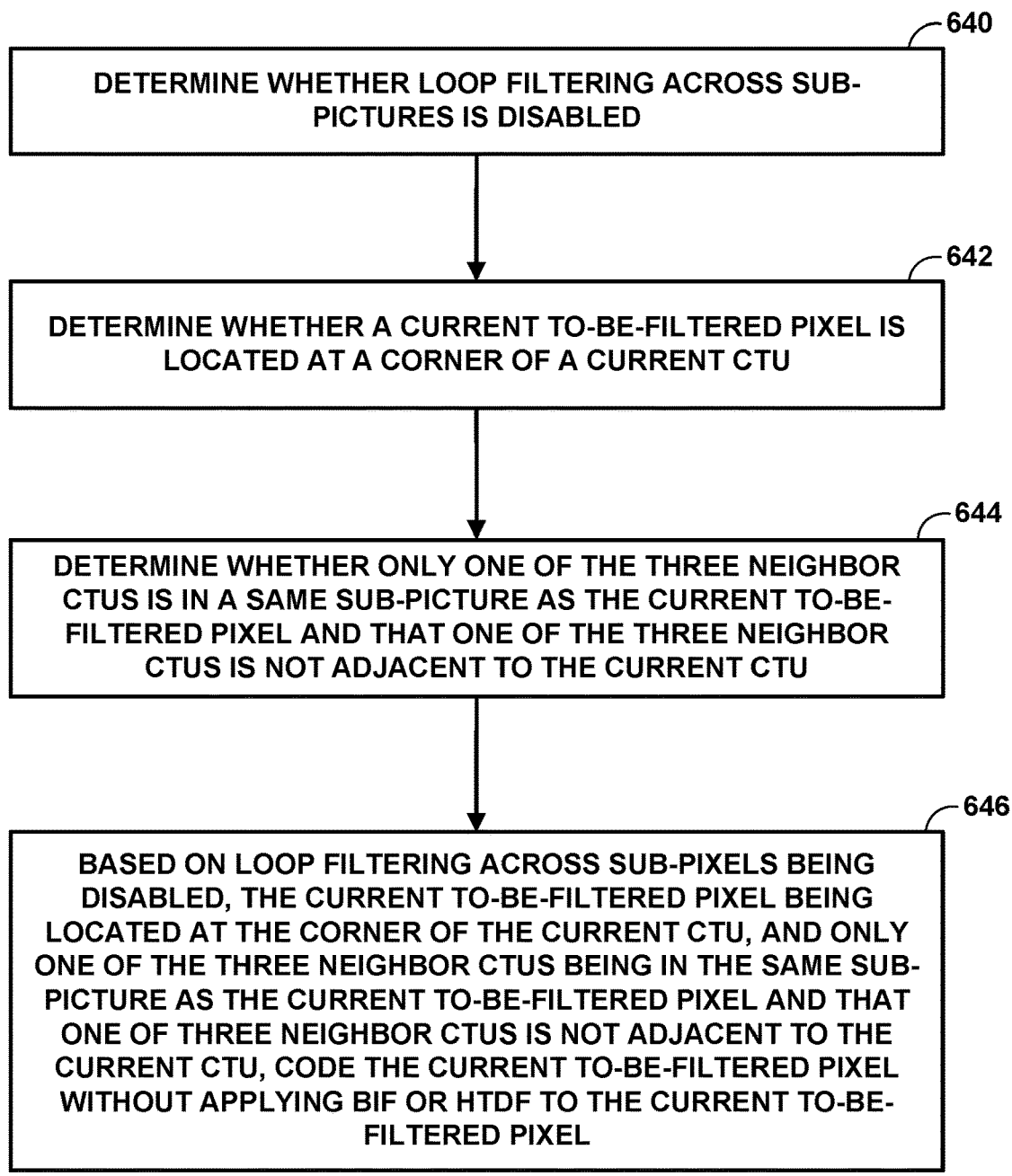

FIG. 29 is another flowchart illustrating an example of picture and sub-picture boundary processing according to the techniques of this disclosure. The techniques of FIG. 29 may be used in combination with other techniques of this disclosure or on their own. Video encoder 200 or video decoder 300 may determine whether loop filtering across sub-pictures is disabled (640). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel is located at a corner of a CTU (642). For example, filter unit 216 of video encoder 200 or filter unit 312 of video decoder 300 may determine whether a current to-be-filtered pixel is located as depicted in FIG. 15. Filter unit 216 of video encoder 200 or filter unit 312 of video decoder 300 may determine whether only one of three neighbor CTUs is in a same sub-picture as the current to-be-filtered pixel and that the one of three neighbor CTUs is not adjacent to a current CTU (644). For example, filter unit 216 of video encoder 200 or filter unit 312 of video decoder 300 may determine whether a current to-be-filtered pixel is located as depicted in FIG. 15. Based on loop filtering across sub-pictures being disabled, a current to-be-filtered pixel being located at the corner of the current CTU, and only one of three neighbor CTUs being in a same sub-picture as the current to-be-filtered pixel and that the one of three neighbor CTUs is not adjacent to a current CTU, video encoder 200 and video decoder 300 may code the current to-be-filtered pixel without applying BIF or HTDF (646).

Figure 30:
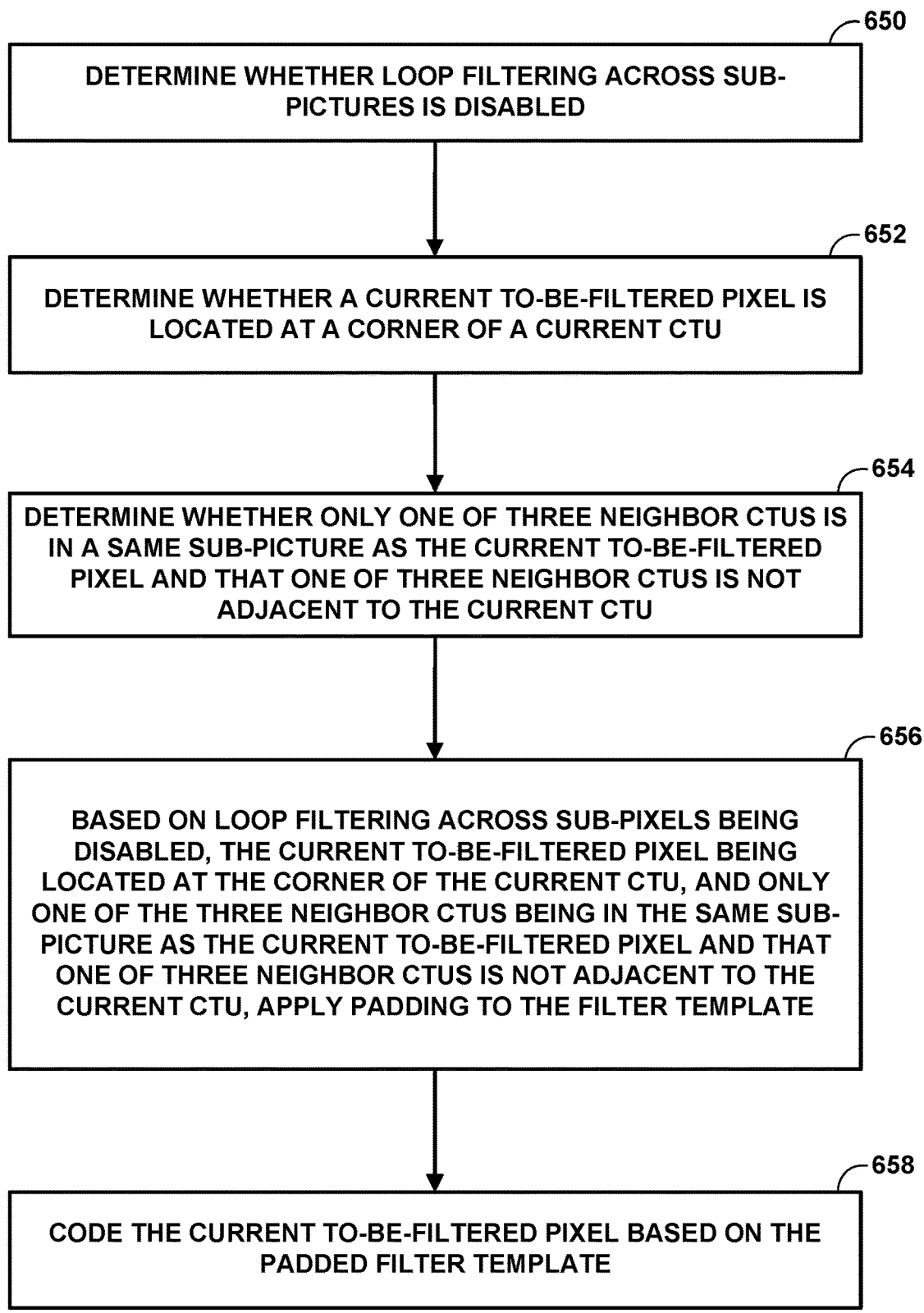

FIG. 30 is another flowchart illustrating an example of picture and sub-picture boundary processing according to the techniques of this disclosure. The techniques of FIG. 30 may be used in combination with other techniques of this disclosure or on their own. Video encoder 200 or video decoder 300 may determine whether loop filtering across sub-pictures is disabled (650). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel is located at a corner of a CTU (652). For example, filter unit 216 of video encoder 200 or filter unit 312 of video decoder 300 may determine whether a current to-be-filtered pixel is located as depicted in FIG. 15. Filter unit 216 of video encoder 200 or filter unit 312 of video decoder 300 may determine whether only one of three neighbor CTUs is in a same sub-picture as the current to-be-filtered pixel and that the one of three neighbor CTUs is not adjacent to a current CTU (654). For example, filter unit 216 of video encoder 200 or filter unit 312 of video decoder 300 may determine whether a current to-be-filtered pixel is located as depicted in FIG. 15. Based on loop filtering across sub-pictures being disabled, a current to-befiltered pixel being located at the corner of the current CTU, and only one of three neighbor CTUs being in a same sub-picture as the current to-be-filtered pixel and that the one of three neighbor CTUs is not adjacent to a current CTU, video encoder 200 and video decoder 300 may apply padding to the filter template (656). For example, filter unit 216 of video encoder 200 or filter unit 312 of video decoder 300 may apply closest padding or mirrored padding to substitute for the pixel beyond the picture boundary. Video encoder 200 or video decoder 300 may code the current-to-be-filtered pixel based on the padded filter template (658).

Figure 31:
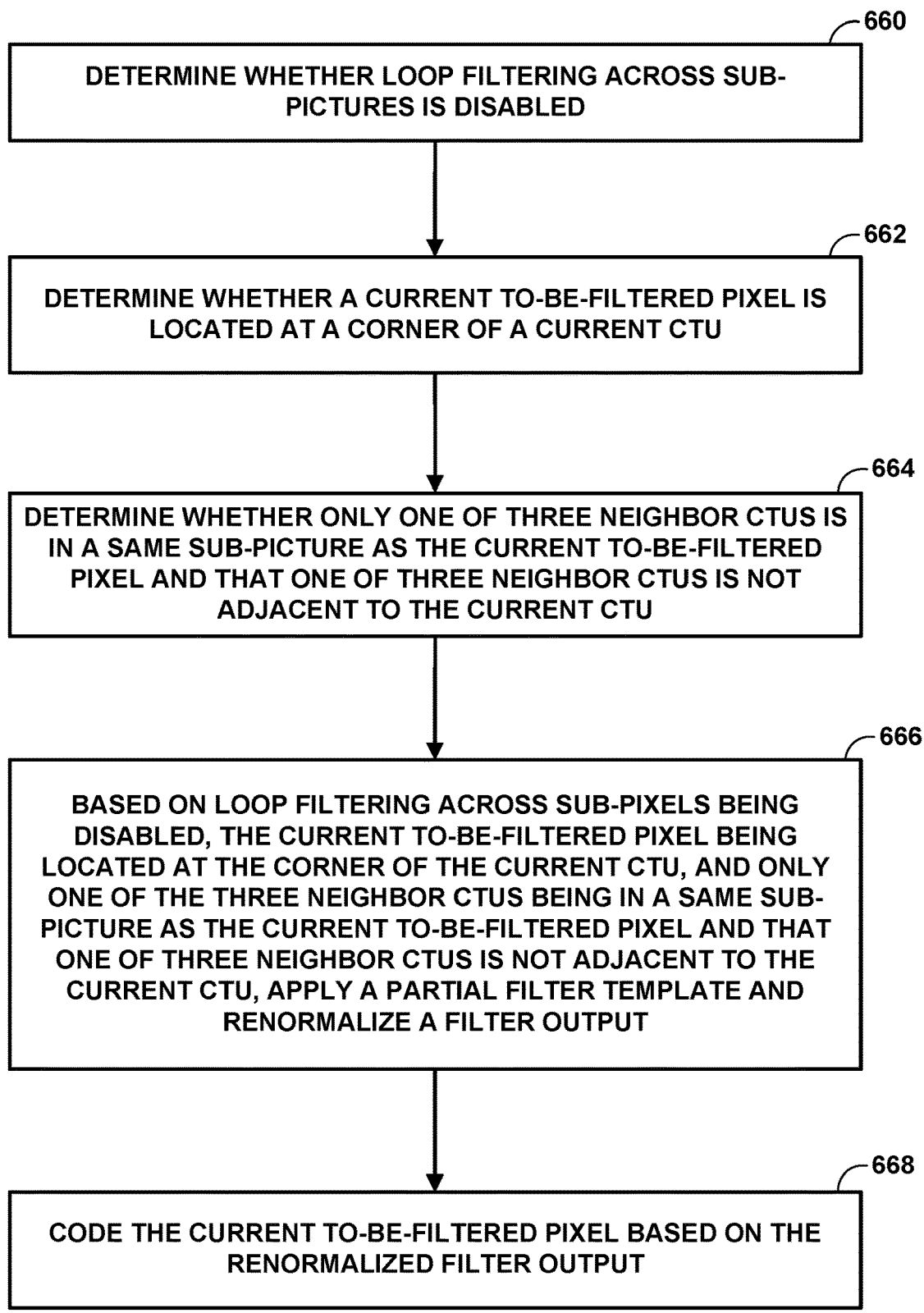

FIG. 31 is another flowchart illustrating an example of picture and sub-picture boundary processing according to the techniques of this disclosure. The techniques of FIG. 31 may be used in combination with other techniques of this disclosure or on their own. Video encoder 200 or video decoder 300 may determine whether loop filtering across sub-pictures is disabled (660). For example, video encoder 200 may determine to disable loop filtering across sub-pictures and signal a flag to be parsed by video decoder 300. Filter unit 216 of video encoder 200 or filter unit 312 of video decoder 300 may determine whether a current to-be-filtered pixel is located at a corner of a CTU (662). For example, filter unit 216 of video encoder 200 or filter unit 312 of video decoder 300 may determine whether a current to-be-filtered pixel is located as depicted in FIG. 15. Filter unit 216 of video encoder 200 or filter unit 312 of video decoder 300 may determine whether only one of three neighbor CTUs is in a same sub-picture as the current to-be-filtered pixel and that the one of three neighbor CTUs is not adjacent to a current CTU (664). For example, filter unit 216 of video encoder 200 or filter unit 312 of video decoder 300 may determine whether a current to-be-filtered pixel is located as depicted in FIG. 15. Based on loop filtering across sub-pictures being disabled, a current to-be-filtered pixel being located at the corner of the current CTU, and only one of three neighbor CTUs being in a same sub-picture as the current to-be-filtered pixel and that the one of three neighbor CTUs is not adjacent to a current CTU, video encoder 200 and video decoder 300 may apply a partial filter template to the current to-be-filtered pixel and renormalize the filter output (666). For example, filter unit 216 of video encoder 200 or filter unit 312 of video decoder 300 may only use available pixels in the template and apply a renormalizing formula, as disclosed herein, to the filter output. Video encoder 200 or video decoder 300 may code the current-to-be-filtered pixel based on the renormalized filter output (668).

Figure 32:
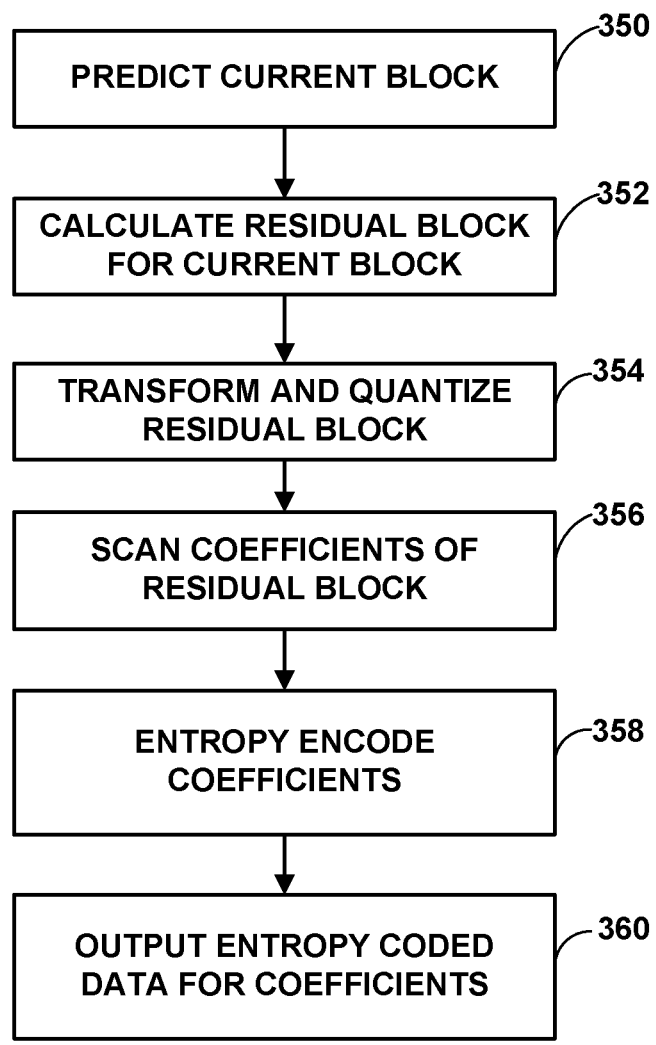
FIG. 32 is a flowchart illustrating an example of video encoding according to the techniques of this disclosure.

FIG. 32 is a flowchart illustrating an example method for encoding a current block. The current block may comprise a current CU. Although described with respect to video encoder 200 (FIGS. 1 and 2), it should be understood that other devices may be configured to perform a method similar to that of FIG. 32.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Figure 33:
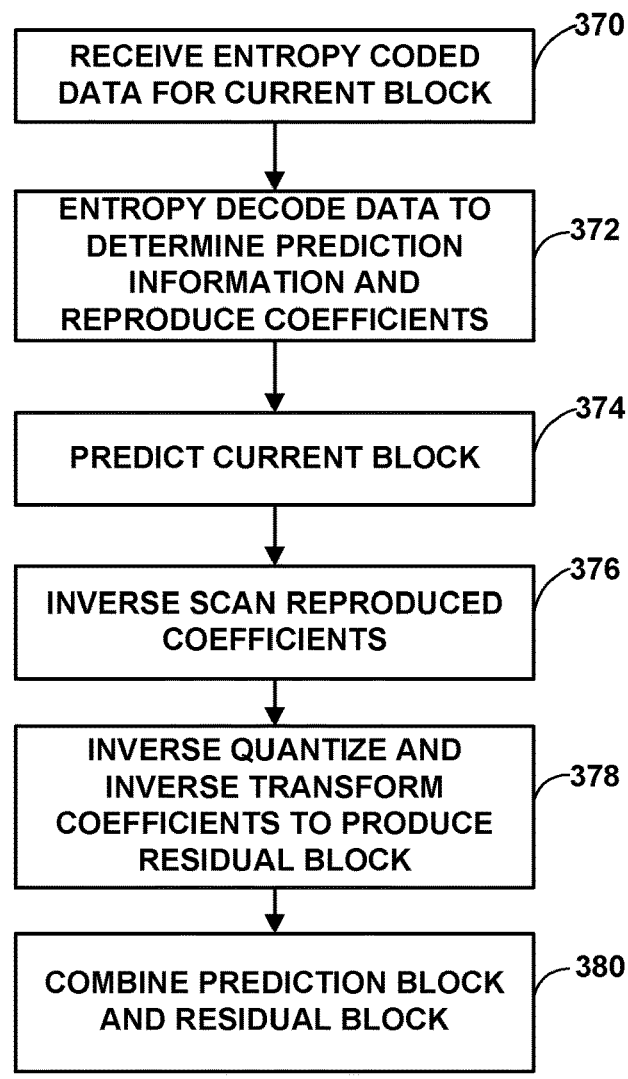
FIG. 33 is a flowchart illustrating an example of video decoding according to the techniques of this disclosure.

FIG. 33 is a flowchart illustrating an example method for decoding a current block of video data. The current block may comprise a current CU. Although described with respect to video decoder 300 (FIGS. 1 and 3), it should be understood that other devices may be configured to perform a method similar to that of FIG. 33.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

The present disclosure contains the following examples.

Example 1. A method of coding video data, the method comprising: determining whether a transform and quantization are applied to a block of the video data; and based on the transform and quantization not being applied to the block of video data, coding the block of video data without applying bilateral filtering (BIF) or Hadamard transform domain filtering (HTDF).

Example 2. The method of example 1, further comprising: determining whether a current to-be-filtered pixel requires a pixel on another side of a virtual boundary in a filter template; and based on the PPS flag being 1 and the current to-be-filtered pixel requiring a pixel on another side of the virtual boundary in the filter template, coding the current to-be-filtered pixel without applying BIF or HTDF to the current to-be-filtered pixel.

Example 3. A method of coding video data, the method comprising: determining whether loop filtering across sub-pictures is disabled; and determining whether a current to-be-filtered pixel requires a pixel in a different sub-picture for a filter template; and coding the video data based upon the determinations.

Example 4. A method of coding video data, the method comprising: determining whether a current to-be-filtered pixel requires a pixel beyond a picture boundary for a filter template; and coding the video data based upon the determination.

Example 5. A method of coding video data, the method comprising: determining whether loop filter across sub-picture is disabled; determining whether a current to-be-filtered pixel is located at a corner of an L-shaped raster scanned sub-picture; determining whether the current to-be-filtered pixel requires a pixel on another side of a sub-picture boundary for a filter template; and coding the video data based upon the determinations.

Example 6. A method of coding video data, the method comprising: determining whether loop filter across sub-picture is disabled; determining whether a current to-be-filtered pixel is located at a corner of a CTU; determining whether only one of three neighbor CTUs is in a same sub-picture as the current to-be-filtered pixel and that the one of three neighbor CTUs is not adjacent to a current CTU; and coding the video data based upon the determinations.

Example 7. The method of any combination of examples 2-6, further comprising not applying BIF or HTDF to the current to-be-filtered pixel.

Example 8. The method of any combination of examples 2-6, further comprising applying padding.

Example 9. The method of example 8, wherein the padding is closest padding.

Example 10. The method of example 8, wherein the padding is mirror padding.

Example 11. The method of any combination of examples 8-10, wherein the applying padding comprises: determining whether there are neighbor pixels in the filter template on another side of a vertical boundary; applying padding for the neighbor pixels in the filter template on the another side of the vertical boundary; determining whether there are neighbor pixels in the filter template on another side of a horizontal boundary; and applying padding for the neighbor pixels in the filter template on the another side of the horizontal boundary.

Example 12. The method of any combination of examples 8-10, wherein the applying padding comprises: determining whether there are neighbor pixels in the filter template on another side of a horizontal boundary; applying padding for the neighbor pixels in the filter template on the another side of the horizontal boundary; determining whether there are neighbor pixels in the filter template on another side of a vertical boundary; and applying padding for the neighbor pixels in the filter template on the another side of the vertical boundary.

Example 13. The method of any combination of examples 2-6, further comprising using fewer than 8 neighbor pixels for filtering the current to-be-filtered pixel.

Example 14. The method of example 13, further comprising using 5 neighbor pixels for filtering the current to-be-filtered pixel.

Example 15. The method of example 13, further comprising using 3 neighbor pixels for filtering the current to-be-filtered pixel.

Example 16. The method of any combination of examples 13-15, further comprising renormalizing the current to-be-filtered pixel.

Example 17. The method of any combination of examples 2-16, further comprising replacing each unavailable pixel in the filter template for the current to-be-filtered pixel with a closest available pixel in the filter template.

Example 18. The method of any combination of examples 2-17, further comprising accounting for unavailable pixels in the filter template for the current to-be-filtered pixel by weighing the sums of available pixels in the filter template.

Example 19. A method of coding video data, the method comprising: storing pixel values for two or more lines of pixels above a current coding tree unit (CTU) of the video data; determining whether at least one of an above-left neighboring pixel, an above-neighboring pixel, or an above-right neighboring pixel of a current pixel is available, wherein the above-left neighboring pixel, the above-neighboring pixel, and the above-right neighboring pixel are not available when the above-left neighboring pixel, the above-neighboring pixel, and the above-right neighboring pixel are not in the two or more lines of pixels above the current CTU; and based on at least one of the above-left neighboring pixel, the above-neighboring pixel, or the above-right neighboring pixel of the current pixel not being available, skipping application of a bilateral filter and/or Hadamard transform domain filter (HTDF) to the current pixel.

Example 20. The method of example 19, wherein a bitstream that includes an encoded representation of the video data includes a flag indicating whether to apply the bilateral filter and/or HTDF to pixels when above-neighboring pixels of the pixels are not available.

Example 21. A method of coding video data, the method comprising: storing pixel values for two or more lines of pixels above a current coding tree unit (CTU) of the video data; determining whether at least one of an above-left neighboring pixel, an above-neighboring pixel, or an above-right neighboring pixel of a current pixel is available, wherein the above-left neighboring pixel, the above-neighboring pixel, and the above-right neighboring pixel are not available when the above-left neighboring pixel, the above-neighboring pixel, and the above-right neighboring pixel are not in the two or more lines of pixels above the current CTU; and based on at least one of the above-left neighboring pixel, the above-neighboring pixel, or the above-right neighboring pixel of the current pixel not being available, applying a bilateral filter and/or Hadamard transform domain filter (HTDF) to the current pixel using values of pixels closest to the above-left neighboring pixel, the above-neighboring pixel, and the above-right neighboring pixel in place of actual values of the above-left neighboring pixel, the above-neighboring pixel, and the above-right neighboring pixel.

Example 22. A method of coding video data, the method comprising: storing pixel values for two or more lines of pixels above a current coding tree unit (CTU) of the video data; determining whether at least one of an above-left neighboring pixel, an above-neighboring pixel, or an above-right neighboring pixel of a current pixel is available, wherein the above-left neighboring pixel, the above-neighboring pixel, and the above-right neighboring pixel are not available when the above-left neighboring pixel, the above-neighboring pixel, and the above-right neighboring pixel are not in the two or more lines of pixels above the current CTU; and based on at least one of the above-left neighboring pixel, the above-neighboring pixel, or the above-right neighboring pixel of the current pixel not being available, applying a bilateral filter and/or Hadamard transform domain filter (HTDF) to the current pixel using values of pixels in a line below the current pixel in place of actual values of the above-left neighboring pixel, the above-neighboring pixel, and the above-right neighboring pixel.

Example 23. A method of coding video data, the method comprising: storing pixel values for two or more lines of pixels above a current coding tree unit (CTU) of the video data; determining whether at least one of an above-left neighboring pixel, an above-neighboring pixel, or an above-right neighboring pixel of a current pixel is available, wherein the above-left neighboring pixel, the above-neighboring pixel, and the above-right neighboring pixel are not available when the above-left neighboring pixel, the above-neighboring pixel, and the above-right neighboring pixel are not in the two or more lines of pixels above the current CTU; and based on at least one of the above-left neighboring pixel, the above-neighboring pixel, or the above-right neighboring pixel of the current pixel not being available, applying a bilateral filter and/or Hadamard transform domain filter (HTDF) to the current pixel using only values of pixels in the two or more lines of pixels.

Example 24. The method of any of examples 19-23, wherein the two or more lines of pixels consists of 4 lines of pixels.

Example 25. The method of any combination of examples 1-24, wherein coding comprises decoding.

Example 26. The method of any combination of examples 1-25, wherein coding comprises encoding.

Example 27. A device for coding video data, the device comprising one or more means for performing the method of any of examples 1-26.

Example 28. The device of example 27, wherein the one or more means comprise one or more processors implemented in circuitry.

Example 29. The device of any of examples 27 and 28, further comprising a memory to store the video data.

Example 30. The device of any of examples 27-29, further comprising a display configured to display decoded video data.

Example 31. The device of any of examples 27-30, wherein the device comprises one or more of a camera, a computer, a mobile device, a broadcast receiver device, or a set-top box.

Example 32. The device of any of examples 27-31, wherein the device comprises a video decoder.

Example 33. The device of any of examples 27-32, wherein the device comprises a video encoder.

Example 34. A computer-readable storage medium having stored thereon instructions that, when executed, cause one or more processors to perform the method of any of examples 1-26.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory (e.g., a non-transitory computer-readable storage medium) or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining whether loop filtering across sub-pictures is disabled for a picture;
   determining whether a first to-be-filtered pixel is located at a corner of a current coding tree unit (CTU) of the picture;
   determining whether only one of three neighbor CTUs is in a same sub-picture as the first to-be-filtered pixel and that the one of three neighbor CTUs is not adjacent to the current CTU; and
   based on loop filtering across sub-pictures being disabled for the picture, the first to-be-filtered pixel being located at the corner of the current CTU, and only one of three neighbor CTUs being in the same sub-picture as the first to-be-filtered pixel and one of the three neighbor CTUs not being adjacent to the current CTU, performing one of: a) coding the first to-be-filtered pixel including refraining from applying bilateral filtering (BIF) or Hadamard transform domain filtering (HTDF) to the first to-be-filtered pixel; b) applying padding to a first filter template and coding the first to-be-filtered pixel based on the padded first filter template; or c) applying a first partial filter template to the first to-be-filtered pixel, renormalizing a first filter output, and coding the first to-be-filtered pixel based on the renormalized first filter output.

2. The method of claim 1, further comprising:
determining whether a second to-be-filtered pixel requires a pixel on another side of a virtual boundary in a second filter template; and
based on the second to-be-filtered pixel requiring the pixel on another side of the virtual boundary in the second filter template, coding the second to-be-filtered pixel including refraining from applying BIF or HTDF to the second to-be-filtered pixel.

3. The method of claim 1, further comprising:
determining whether a second to-be-filtered pixel requires a pixel on another side of a virtual boundary in a second filter template;
based on the second to-be-filtered pixel requiring a pixel on another side of the virtual boundary in the second filter template, applying padding to the second filter template; and
coding the second to-be-filtered pixel based on the padded second filter template.

4. The method of claim 1, further comprising:
determining whether a second to-be-filtered pixel requires a pixel on another side of a virtual boundary in a second filter template;
based on the second to-be-filtered pixel requiring a pixel on another side of the virtual boundary in the second filter template, applying a second partial filter template to the second to-be-filtered pixel and renormalizing a second filter output; and
coding the second to-be-filtered pixel based on the renormalized second filter output.

5. The method of claim 1, further comprising:
determining whether a second to-be-filtered pixel requires, in a second filter template, a pixel located in a different sub-picture than a sub-picture in which the second to-be-filtered pixel is located; and
based on loop filtering across sub-pictures being disabled and the second to-be filtered pixel requiring the pixel in the different sub-picture in the second filter template, coding the second to-be-filtered pixel including refraining from applying BIF or HTDF to the second to-be-filtered pixel.

6. The method of claim 5, wherein the sub-picture in which the second to-be-filtered pixel is located comprises a slice, a tile, a tile group, or a brick.

7. The method of claim 1, further comprising:
determining whether a second to-be-filtered pixel requires, in a second filter template, a pixel located in a sub-picture different than a sub-picture in which the second to-be-filtered pixel is located;
based on loop filtering across sub-pictures being disabled and the second to-be filtered pixel requiring the pixel in a different sub-picture in the second filter template, applying padding to the second filter template; and
coding the second to-be-filtered pixel based on the padded second filter template.

8. The method of claim 1, further comprising:
determining whether a second to-be-filtered pixel requires, in a second filter template, a pixel located in a sub-picture different than a sub-picture in which the second to-be-filtered pixel is located;
based on loop filtering across sub-pictures being disabled and the second to-be filtered pixel requiring the pixel in the different sub-picture in the second filter template, applying a second partial filter template to the second to-be-filtered pixel and renormalizing a second filter output; and
coding the second to-be-filtered pixel based on the renormalized second filter output.

9. The method of claim 1, further comprising:
determining whether a second to-be-filtered pixel requires a pixel beyond a picture boundary in a second filter template; and
based on the second to-be-filtered pixel requiring the pixel beyond the picture boundary in the second filter template, coding the second to-be-filtered pixel including refraining from applying BIF or HTDF to the second to-be-filtered pixel.

10. The method of claim 1, further comprising:
determining whether a second to-be-filtered pixel requires a pixel beyond a picture boundary in a second filter template;
based on the second to-be-filtered pixel requiring the pixel beyond the picture boundary in the second filter template, applying padding to the second filter template; and
coding the second to-be-filtered pixel based on the padded second filter template.

11. The method of claim 1, further comprising:
determining whether a second to-be-filtered pixel requires a pixel beyond a picture boundary in a second filter template;
based on the second to-be-filtered pixel requiring the pixel beyond the picture boundary in the second filter template, applying a second partial filter template to the second to-be-filtered pixel and renormalizing a second filter output; and
coding the second to-be-filtered pixel based on the renormalized second filter output.

12. The method of claim 1, further comprising:
determining whether a second to-be-filtered pixel is located at a corner of an L-shaped raster scanned sub-picture;
determining whether the second to-be-filtered pixel requires a pixel on another side of a sub-picture boundary in a second filter template; and
based on loop filtering across sub-pictures being disabled, the second to-be-filtered pixel being located at the corner of the L-shaped raster scanned sub-picture, and the second to-be-filtered pixel requiring the pixel on another side of the sub-picture boundary in the second filter template, coding the second to-be-filtered pixel including refraining from applying BIF or HTDF to the second to-be-filtered pixel.

13. The method of claim 1, further comprising:
determining whether a second to-be-filtered pixel is located at a corner of an L-shaped raster scanned sub-picture;
determining whether the second to-be-filtered pixel requires a pixel on another side of a sub-picture boundary in a second filter template; and
based on loop filtering across sub-pictures being disabled, the second to-be-filtered pixel being located at the corner of the L-shaped raster scanned sub-picture, and the second to-be-filtered pixel requiring the pixel on another side of the sub-picture boundary in the second filter template, applying padding to the second filter template; and
coding the second to-be-filtered pixel based on the padded second filter template.

14. The method of claim 1, further comprising:
   determining whether a second to-be-filtered pixel is located at a corner of an L-shaped raster scanned sub-picture;
   determining whether the second to-be-filtered pixel requires a pixel on another side of a sub-picture boundary in a second filter template;
   based on loop filtering across sub-pictures being disabled, the second to-be-filtered pixel being located at the corner of the L-shaped raster scanned sub-picture, and the second to-be-filtered pixel requiring the pixel on another side of the sub-picture boundary in the second filter template, applying a second partial filter template to the second to-be-filtered pixel and renormalizing a second filter output; and
   coding the second to-be-filtered pixel based on the renormalized second filter output.

15. A device for coding video data, the device comprising:
   a memory configured to store a first to-be-filtered pixel; and
   one or more processors, implemented in circuitry, and communicatively coupled to the memory, the one or more processors being configured to:
      determine whether loop filtering across sub-pictures is disabled for a picture;
      determine whether a first to-be-filtered pixel is located at a corner of a current coding tree unit (CTU) of the picture;
      determine whether only one of three neighbor CTUs is in a same sub-picture as the first to-be-filtered pixel and that the one of three neighbor CTUs is not adjacent to the current CTU; and
      based on loop filtering across sub-pictures being disabled for the picture, the first to-be-filtered pixel being located at the corner of the current CTU, and only one of three neighbor CTUs being in the same sub-picture as the first to-be-filtered pixel and one of the three neighbor CTUs not being adjacent to the current CTU, perform one of: a) code the first to-be-filtered pixel including refraining from applying bilateral filtering (BIF) or Hadamard transform domain filtering (HTDF) to the first to-be-filtered pixel; b) apply padding to a first filter template and code the first to-be-filtered pixel based on the padded first filter template; or c) apply a first partial filter template to the first to-be-filtered pixel, renormalize a first filter output, and code the first to-be-filtered pixel based on the renormalized first filter output.

16. The device of claim 15, wherein the one or more processors are further configured to:
   determine whether a second to-be-filtered pixel requires a pixel on another side of a virtual boundary in a second filter template; and
   based on the second to-be-filtered pixel requiring the pixel on another side of the virtual boundary in the second filter template, code the second to-be-filtered pixel and refrain from applying BIF or HTDF to the second to-be-filtered pixel.

17. The device of claim 15, wherein the one or more processors are further configured to:
   determine whether a second to-be-filtered pixel requires a pixel on another side of a virtual boundary in a second filter template;
   based on the second to-be-filtered pixel requiring the pixel on another side of the virtual boundary in the second filter template, apply padding to the second filter template; and
   code the second to-be-filtered pixel based on the padded second filter template.

18. The device of claim 15, wherein the one or more processors are further configured to:
   determine whether a second to-be-filtered pixel requires a pixel on another side of a virtual boundary in a second filter template;
   based on the second to-be-filtered pixel requiring the pixel on another side of the virtual boundary in the second filter template, apply a second partial filter template to the second to-be-filtered pixel and renormalize a second filter output; and
   code the second to-be-filtered pixel based on the renormalized second filter output.

19. The device of claim 15, wherein the one or more processors are further configured to:
   determine whether a second to-be-filtered pixel requires, in a second filter template, a pixel located in a sub-picture different than a sub-picture in which the second to-be-filtered pixel is located; and
   based on loop filtering across sub-pictures being disabled and the second to-be filtered pixel requiring the pixel in the different sub-picture in the second filter template, code the second to-be-filtered pixel and refrain from applying BIF or HTDF to the second to-be-filtered pixel.

20. The device of claim 15, wherein the one or more processors are further configured to:
   determine whether a second to-be-filtered pixel requires, in a second filter template, a pixel located in a sub-picture different than a sub-picture in which the second to-be-filtered pixel is located;
   based on loop filtering across sub-pictures being disabled and the second to-be filtered pixel requiring the pixel in the different sub-picture in the second filter template, apply padding to the second filter template; and
   code the second to-be-filtered pixel based on the padded second filter template.

21. The device of claim 15, wherein the one or more processors are further configured to:
   determine whether a second to-be-filtered pixel requires, in a second filter template, a pixel located in a sub-picture different than a sub-picture in which the second to-be-filtered pixel is located;
   based on loop filtering across sub-pictures being disabled and the second to-be filtered pixel requiring the pixel in the different sub-picture in the second filter template, apply a second partial filter template to the second to-be-filtered pixel and renormalize a second filter output; and
   code the second to-be-filtered pixel based on the renormalized second filter output.

22. The device of claim 15, wherein the one or more processors are further configured to:
   determine whether a second to-be-filtered pixel requires a pixel beyond a picture boundary in a second filter template; and
   based on the second to-be-filtered pixel requiring the pixel beyond the picture boundary in the second filter template, code the second to-be-filtered pixel and refrain from applying BIF or HTDF to the second to-be-filtered pixel.

23. The device of claim 15, wherein the one or more processors are further configured to:
   determine whether a second to-be-filtered pixel requires a pixel beyond a picture boundary in a second filter template; and based on the second to-be-filtered pixel requiring the pixel beyond the picture boundary in the second filter template, apply padding to the second filter template; and code the second to-be-filtered pixel based on the padded second filter template.

24. The device of claim 15, wherein the one or more processors are further configured to:

determine whether a second to-be-filtered pixel requires a pixel beyond a picture boundary in a second filter template; and based on the second to-be-filtered pixel requiring the pixel beyond the picture boundary in the second filter template, apply a second partial filter template to the second to-be-filtered pixel and renormalize a second filter output; and code the second to-be-filtered pixel based on the renormalized second filter output.

25. The device of claim 15, wherein the one or more processors are further configured to:

determine whether a second to-be-filtered pixel is located at a corner of an L-shaped raster scanned sub-picture;

determine whether the second to-be-filtered pixel requires a pixel on another side of a sub-picture boundary in a second filter template; and based on loop filtering across sub-pictures being disabled, the second to-be-filtered pixel being located at the corner of the L-shaped raster scanned sub-picture, and the second to-be-filtered pixel requiring the pixel on another side of the sub-picture boundary in the second filter template, code the second to-be-filtered pixel and refrain from applying BIF or HTDF to the second to-be-filtered pixel.

26. The device of claim 15, wherein the device comprises a wireless communication device.

27. The device of claim 15, wherein the one or more processors are further configured to:

determine whether a second to-be-filtered pixel is located at a corner of an L-shaped raster scanned sub-picture;

determine whether the second to-be-filtered pixel requires a pixel on another side of a sub-picture boundary in a second filter template; and based on loop filtering across sub-pictures being disabled, the second to-be-filtered pixel being located at the corner of the L-shaped raster scanned sub-picture, and the second to-be-filtered pixel requiring the pixel on another side of the sub-picture boundary in the second filter template, apply padding to the second filter template; and code the second to-be-filtered pixel based on the padded second filter template.

28. The device of claim 15, wherein the one or more processors are further configured to:

determining whether a second to-be-filtered pixel is located at a corner of an L-shaped raster scanned sub-picture;

determining whether the second to-be-filtered pixel requires a pixel on another side of a sub-picture boundary in a second filter template;

based on loop filtering across sub-pictures being disabled, the second to-be-filtered pixel being located at the corner of the L-shaped raster scanned sub-picture, and the second to-be-filtered pixel requiring the pixel on another side of the sub-picture boundary in the second filter template, applying a second partial filter template to the second to-be-filtered pixel and renormalizing a second filter output; and coding the second to-be-filtered pixel based on the renormalized second filter output.

29. A non-transitory computer-readable storage medium storing instructions that, when executed, cause one or more processors to:

determine whether loop filtering across sub-pictures is disabled for a picture;

determine whether a first to-be-filtered pixel is located at a corner of a current coding tree unit (CTU) of the picture;

determine whether only one of three neighbor CTUs is in a same sub-picture as the first to-be-filtered pixel and that the one of three neighbor CTUs is not adjacent to the current CTU; and based on loop filtering across sub-pictures being disabled for the picture, the first to-be-filtered pixel being located at the corner of the current CTU, and only one of three neighbor CTUs being in the same sub-picture as the first to-be-filtered pixel and one of the three neighbor CTUs not being adjacent to the current CTU, perform one of: a) code the first to-be-filtered pixel including refraining from applying bilateral filtering (BIF) or Hadamard transform domain filtering (HTDF) to the first to-be-filtered pixel; b) apply padding to a first filter template and code the first to-be-filtered pixel based on the padded first filter template; or c) apply a first partial filter template to the first to-be-filtered pixel, renormalize a first filter output, and code the first to-be-filtered pixel based on the renormalized first filter output.

* * * * *